US008366810B1

(12) United States Patent
Miller

(10) Patent No.: US 8,366,810 B1
(45) **Date of Patent: *Feb. 5, 2013**

(54) PNEUMATIC PARTICULATES AND/OR ROCK PROCESSING

(76) Inventor: Richard L. Miller, Apple Valley, MN (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/803,990

(22) Filed: Jul. 12, 2010

Related U.S. Application Data

(63) Continuation-in-part of application No. 12/460,065, filed on Jul. 13, 2009, now Pat. No. 7,867,323, which is a continuation of application No. 11/644,167, filed on Dec. 22, 2006, now Pat. No. 7,559,962.

(60) Provisional application No. 61/270,750, filed on Jul. 13, 2009, provisional application No. 61/270,758, filed on Jul. 13, 2009, provisional application No. 61/338,308, filed on Feb. 17, 2010.

(51) Int. Cl.
*B01D 46/00* (2006.01)

(52) U.S. Cl. ................ 95/273; 55/319; 55/356; 55/429; 55/467

(58) Field of Classification Search ................. 15/300.1, 15/315, 347, 348; 55/DIG. 3, 283, 309, 311, 55/314, 315, 319, 345–348, 35, 471–473, 55/467; 171/1, 11, 17; 134/18; 209/133, 209/134, 135; 96/273
See application file for complete search history.

(56) References Cited

U.S. PATENT DOCUMENTS

| | | | | |
|---|---|---|---|---|
| 2,635,745 A * | 4/1953 | Mead et al. | ..................... | 209/35 |
| 3,955,236 A * | 5/1976 | Mekelburg | ..................... | 15/314 |
| 5,351,832 A * | 10/1994 | Abbott et al. | ............. | 209/139.1 |
| 5,411,142 A * | 5/1995 | Abbott et al. | .................. | 209/29 |
| 6,283,300 B1 * | 9/2001 | Bielagus et al. | ................ | 209/29 |

* cited by examiner

*Primary Examiner* — Duane Smith
*Assistant Examiner* — Sonji Turner
(74) *Attorney, Agent, or Firm* — Robert A. Elwell

(57) ABSTRACT

A method for separating mixed granular material based upon dissimilar specific gravities, (such as in firearm range cleaning) thereby separating lead from backstop material. Lead falling from an airstream is airwashed by an upwardly directed second airstream. The preferred method is performed under negative pressure to control lead dust. Application to pick up and clean or recover fouled ballast rock (such as used in the rail industry). Processes and apparatus are disclosed that pick up and clean or enrich precious metal bearing ore.

10 Claims, 24 Drawing Sheets

300

PNEUMATIC PARTICULATES AND/OR ROCK PROCESSING

RELATED APPLICATIONS

This application is a continuation-in-part of U.S. application Ser. No. 12/460,065 filed Jul. 13, 2009, now U.S. Pat. No. 7,867,323 which is a continuation of Ser. No. 11/644,167 filed Dec. 22, 2006, now U.S. Pat. No. 7,559,962, hereby incorporated by reference in its entirety and to which application priority is claimed under 35 U.S.C. §120. This application also claims priority to U.S. provisional applications 61/270,750 and 61/270,758, both filed Jul. 13, 2009, and U.S. provisional application 61/338,308 filed Feb. 17, 2010, all three of which provisional applications are hereby incorporated by reference in their entirety herein.

BACKGROUND OF THE INVENTION

1. Field of the Invention

The present invention is directed to an apparatus and method for vacuuming up rock, debris, particulates, soils or ores for further pneumatic processing and more particularly directed to an apparatus and method for separating the rock, such as landscape rock or railroad ballast rock or ores or lead particulates in soil from the debris and/or other density different materials and thereby cleaning the landscape rock, railroad ballast, or reclaiming the lead particulates or enriching or concentrating the ore. The present invention is also directed to a method of separation and more particularly a method of separation useful for firearm range cleaning and similar situations.

2. Description of Related Art

There are many forms of decorative ground cover including mulch and decorative rock. Most forms of decorative ground cover deteriorate over time. Mulch decays, fades, and gets carried away by wind, water, animal foraging, and foot traffic. It frequently requires annual replenishment. Decorative rock is stable and lasts for years, but it is also prone to losing its aesthetic qualities. Silt, soil or both washes into the decorative rock from the adjacent ground and from downspout runoff. Decomposed leaves, seeds, sticks, grass trimmings, etc. eventually fill in the decorative ground cover. Over time weeds proliferate because of the accumulation of dirt. In arid areas the buildup of airborne sand is a problem. If located near roadways, there can be a problem with sand from snow removal.

Home owners have struggled to clean their landscape rock in a variety of ways including picking it up manually and cascading it over an improvised screening device while simultaneously hosing it off. Such methods are cumbersome, tedious and involve handling the rock multiple times.

Commercial grounds keepers generally opt to just replace the rock, bringing in front-end loaders and other heavy equipment. This is expensive and prone to causing damage to existing lawns and shrubbery. Equipment is currently available for picking up landscape rock by means of a vacuum. Examples of such vacuum systems include U.S. Pat. No. 4,723,971 entitled "Industrial Vacuum Cleaner" issued on Feb. 9, 1988 to Ladislan B. Caldas, U.S. Pat. No. 4,735,639 entitled "Modular Industrial Vacuum Loading Apparatus for Ingesting and Collecting Debris and Filtering Discharged Air" issued on Apr. 5, 1988 to Duncan Johnstone, the teachings of which are incorporated herein by reference in their entirety, as well as the industrial vacuum sold by Christianson Systems, Inc. of Blomkest, Minn. under the tradename "RockVac." But, such vacuums do not clean the rock so it can be reused. The old rock, along with accompanying dirt and debris, is often disposed of in landfills, thereby exacerbating a growing ecological problem.

Accordingly, there is a need for an apparatus for cleaning landscape rock that can be made portable for on-site use, that is reliable, that is relatively easy to operate, that is capable of handling rock and debris that is accompanied by broad range of moisture contents, and that does not discharge an appreciable amount of dust to the environment.

SUMMARY

The present invention is an apparatus that uses vacuum to pick up and clean landscape rock. The preferred embodiment consists of an intake means through which rock and debris are sucked into the apparatus, an entry section, a rock-debris separator chamber, a pre-exhaust, a means of collecting the cleaned rock for reuse, an air-debris separator cell, a means of collecting the debris for disposal or reuse, and a vacuum means consisting of a dust collector and a vacuum blower or pump.

Immediately upon being picked up by vacuum through the intake head, the rocks collide with each other and with the walls of the intake hose where dirt adhering to the rocks is dislodged, thereby initiating the cleaning of the rock that takes place within the apparatus. The flow of air, rock and debris entering through the intake means passes into an entry section, which is a generally horizontal chamber. Within this entry section the rocks continue to collide with each other and with the walls of the entry section, thereby continuing the cleaning process that started within the intake hose. Additionally, the top of the entry section is made to slope downward toward the entry section outlet, thereby deflecting the flow downward as the air, rock and debris leave the entry section.

Upon leaving the entry section, the flow enters a rock-debris separator chamber where the rocks continue to collide with one another and with the walls of the chamber and where the separation of the rock and debris takes place. Because of the larger dimensions of the chamber the velocity decreases substantially, thereby facilitating the separation by gravity of the rock from the debris. The bottom of the chamber slopes downward toward the discharge outlet through which the cleaned rocks are removed and collected in a collection means such as a removable 5-gallon pail or a hopper, from which the rock is periodically removed for reuse. The air and entrained debris is removed through the chamber exhaust outlet on the top of the chamber.

Ambient air is pulled by vacuum into the discharge outlet or the collection means, where it flows upward through the discharge outlet into the chamber and out through the chamber exhaust along with the main flow of air entering through the intake means. The countercurrent flow of air and rock within the discharge outlet entrains the debris, but not the denser rock as it leaves the chamber. This upward airflow from the discharge outlet also assists in carrying the separated debris upward toward the chamber exhaust outlet.

Another embodiment of the chamber design involves an auxiliary air supply directly to the chamber, entering on the side opposite the chamber inlet and works in conjunction with another embodiment, a flexible impaction shield. Both minimize the accumulation of damp debris on the chamber walls resulting from the direct, high velocity impact of air on the inner walls of the chamber.

The chamber may also have an access means to allow personnel to inspect, repair and maintain the inside of the chamber.

The velocity of the flow of air, rock and debris within the chamber is further reduced by another aspect of the preferred embodiment, the pre-exhaust. The pre-exhaust abruptly withdraws a portion of the entering air from the entry section, the inlet side of the chamber or from the top of the chamber with the aid of a partition located close to the inlet side of the chamber. If the partition is employed, it extends preferably from just above the top of the chamber inlet to the chamber exhaust outlet. The top portion of the partition is pivotally connected to the bottom portion of the partition so that it can be adjusted to alter the relative flow rates of air leaving through the pre-exhaust outlet and the chamber exhaust outlet.

The air and debris exhausted from the pre-exhaust outlet and the chamber exhaust outlet flows vertically upward to the air-debris separator cell, or cell, located directly above the chamber. The cell is oriented horizontally and is substantially cylindrical or oval in configuration. The entering air undergoes a rapid decrease in velocity due to the much larger dimensions of the cell, thereby allowing the debris to separate from the air primarily by gravity settling.

There are many possible configurations of cell inlets and outlets, but the preferred arrangement is for the flow to enter vertically in an upward direction in the cell bottom portion of the cell middle section. The location of the vertical cell inlet(s), as it penetrates the circumference of the cell, lies between radial and tangential, though closer to the latter is preferred. This configuration minimizes the direct high-velocity impingement of damp debris with the inner wall of the cell nearest the point of entry.

Two cell end sections are formed within the cell by vertical baffles that extend from the cell top portion partway into the cell bottom portion. Air is withdrawn through cell exhaust plenums located in the top of each cell end section. Cell exhaust plenums in both cell end sections contain cell exhaust outlets. Cell exhaust plenum inlets, disposed in both cell end sections, may comprise filters or inlet ducts in the top portion of each end section.

Damp debris and dry debris exhibit significant differences in their air handling characteristics, which can affect the buildup of damp debris within the cell and the efficiency of separation. Two embodiments, a flexible impaction shield and a damp debris grate, minimize the buildup of damp debris. Two additional embodiments, internal baffles and a dry debris grate, maximize the separation efficiency with dry debris.

Gravity settling of debris occurs along all or most of the flow path within the cell and debris is collected within the bottom portion of the cell and periodically removed by manual or automatic means. Collected debris, which is a by-product of the cleaning operation, can be disposed of or it can be used, among other things for leveling under the landscape fabric or plastic sheet to restore the rock bed.

The exhaust air from the air-debris cell flows to a vacuum source, consisting of a vacuum blower or a mechanical vacuum pump and a dust collector such as a bag collector, where the dust collector is located after blower or before the pump, depending on which device is used to generate the vacuum.

In another embodiment of the invention, the intake means may be connected directly to the rock-debris separation chamber, thereby eliminating the entry section; though its inclusion in the apparatus is preferred.

The foregoing embodiments of the invention satisfy the operational requirements of a portable apparatus for picking up and cleaning landscape rock and other similar solids, the need for which is well understood.

In another embodiment of the invention, an apparatus is disclosed that vacuums up debris only, including moist or damp debris, and collects the debris so that it can be disposed of appropriately. This embodiment includes an intake means, an air-debris separator cell, a debris collection means, and a vacuum means, but not a rock-debris separator chamber.

In another embodiment of the invention, an apparatus is disclosed that vacuums up both rock and debris, in which the cleaned rock is collected for reuse, but which does not include an air-debris separator cell.

The above described features and other features and advantages of this invention and the manner of realizing them will become more apparent, and the invention itself will be best understood, from a study of the following description and appended claims, with reference to the attached drawings showing the preferred embodiments of the invention. It should be understood that the particular specifications, configurations or geometrical relationships of the invention are exemplary only and are not to be regarded as limitations of the invention. Nor is the invention, particularly as it pertains to the rock-debris separator chamber, in any way invalidated by the substitution of alternative means of separation of air and debris or particulate matter that are well-known to those skilled in the art. Further, the applicability of the invention is not limited to on-site cleaning of landscape rock using a portable version of this invention. The invention described herein may also be used in larger-scale stationary operations to which rock is routinely hauled from many sites. In another embodiment, the present invention is a process for picking up and cleaning ballast rock. The process includes the steps of—providing an apparatus for picking up and cleaning ballast rock including —an intake having a head at one end and an outlet at the other end, —a chamber having a bottom, an inside and an outside and a chamber inlet fluidly connected to the outlet end of the intake and disposed to receive an airstream from the intake and to direct at least a portion of the airstream from the intake into the chamber, the airstream capable of entraining rock and debris within the airstream, the chamber having a chamber exhaust outlet for discharging air and debris from the chamber, the chamber having a chamber discharge outlet located on the bottom of the chamber for discharging ballast rocks falling by gravity through and from the chamber, —a vacuum source for producing vacuum, the vacuum source fluidly connected to the chamber, whereby the airstream is drawn into the chamber by vacuum applied through the intake to the head end of the intake; whereby ballast rock and debris is vacuumed into the intake at the head end of the intake forming an airstream with entrained ballast rock and debris and wherein the airstream with entrained ballast rock and debris is transported to the chamber whereafter the ballast rock and debris of the airstream with entrained ballast rock and debris enters the chamber at the chamber inlet and the velocity of the airstream with entrained ballast rock and debris slows thereby allowing the ballast rock to fall under gravity to the chamber discharge outlet while the debris exits the chamber through the chamber exhaust outlet. With such an apparatus, the next step is —vacuuming ballast rock and debris into the intake at the head end of the intake. Then the step of —transporting the ballast rock into the chamber by the airstream created by applying vacuum to the head end of the intake is undertaken. Next, the step of —slowing the velocity of the airstream with entrained ballast rock and debris in the chamber thereby allowing the ballast rock to fall under gravity to the chamber discharge outlet while the debris exits the chamber through the chamber exhaust outlet is implemented. In another embodiment, the present invention is a method of removing and cleaning fouled ballast rock.

This method includes the steps of —creating an airstream containing ballast rock, the airstream moving through an intake having sides and then —colliding the ballast rock with each other and with the sides of the intake to dislodge dirt adhering to the ballast rock. In yet another embodiment, the present invention is a method for separating a mixed granular material into two segregated populations of granules. In the method of this embodiment, the two segregated populations of granules are each characterized by a dissimilar range of specific gravity. These two populations may be understood as defining, first, a high specific gravity range granular material and defining, second, a low specific gravity range granular material. The method for separating the two populations includes the steps of: —providing an initial airstream; incorporating the mixed granular material into the initial airstream; slowing the initial airstream to allow the high specific gravity material to fall; —providing a second airstream with an upward direction and directing the second airstream against the falling high specific gravity material to air-wash the falling high specific gravity material; and collecting the air-washed high specific gravity material. The low specific gravity material may be collected subsequently, thereby separating the two populations. The method is applicable to mixtures of spent firearms projectiles and backstop material, such as for example, mixtures of lead bullets (high specific gravity population) and rubber pellets (low specific population) or mixtures of lead bullets (high specific gravity population) and sand (low specific gravity population) or mixtures of lead shot (high specific gravity population) and dirt (low specific gravity population), all of which might be encountered in recovering lead from firing ranges. Preferably, the mixture has been screened or otherwise limited in particle size. That is, the method effectiveness suffers when excessively large particles are present in the mixture, for example large rocks in mixtures with dirt and spent lead may degrade the effectiveness of the separation, either by plugging passages or by large rocks behaving differently than the smaller particle sized dirt population in airstreams or requiring excessively high velocity airstreams to incorporate the mixture into the airsteam. Screening, for example, can limit such problematic size distribution degradation by removing large rocks from the lead and dirt mixture prior to incorporation into the initial airstream. Incorporation of the mixture into the initial airstream can be by vacuuming through a hose or mechanically dispensing the mixture into the airstream, for example, by dropping screened mixtures into a suitable initial airstream or by elevating the mixture into an airstream or by horizontally advancing the mixture into an airstream. The step of slowing the initial airstream bearing the suspended mixed granular materials to a second velocity, slower than the first velocity, preferably includes a step of providing a pre-exhaust, such as earlier described with respect to cleaning landscape rock. Preferably, the provided pre-exhaust abruptly removes a portion of the initial airstream prior to a directional change of the airstream to approximately vertical and upwardly directed. Preferably, the slowed initial airstream turns approximately vertical and upwardly in direction. Preferably, momentum of the suspended mixed granular material along with the slowed initial airstream carries the mixed granular material forward as the slowed initial airstream turns approximately vertical. More preferably, with respect to the initial air stream slowing, the percentage of air removed by the provided pre-exhaust from the initial airstream is from about 35% to about 50% of the volume of the initial airstream. Preferably, the initial airstream is confined within a first cross-sectional area and further wherein the step of slowing the initial airstream bearing the suspended mixed granular materials to a second velocity, slower than the first velocity, includes a step of expanding the confining cross-sectional area to a second cross-sectional area, greater than the first cross-sectional area. Preferably, combining the second airstream with the slowed initial airstream, results in any removed low specific gravity range granular material air-washed from the falling high specific gravity range material rejoining the slowed, initial airstream and the main portion of the population of the low specific gravity range granular material suspended therein. Preferably, the low specific gravity range granular material is subsequently removed from the slowed initial airstream by further slowing the slowed initial airstream to a third velocity, the third velocity slower than the second velocity, such that the low specific gravity range granular material falls from the third velocity airstream. The low specific gravity range granular material falling from the third velocity airstream is then collected. As noted earlier, preferably, the mixed granular material to be separated is pre-screened to a predetermined range of size. Preferably, the mixed granular material to be separated is pre-dried to predetermined moisture content. In another embodiment, the present invention is a method for separating a mixed granular material into two segregated populations of granules, the two segregated populations of granules each characterized by a dissimilar range of specific gravity and defining a high specific gravity range granular material and a low specific gravity range granular material. The method for separating includes the steps of: providing an initial airstream, the initial airstream having a first velocity capable of suspending the mixed granular material; incorporating the mixed granular material into the initial airstream to suspend and transport the mixed granular material; slowing the initial airstream bearing the suspended mixed granular materials to a second velocity, slower than the first velocity, such that the high specific gravity range granular material falls from the slowed, initial airstream and the low specific gravity range granular material remains suspended in the slowed, initial airstream; providing a second airstream, the second airstream upwardly directed and arranged to have a counter-current relationship to the falling high specific gravity range granular material, the second airstream having a velocity insufficient to entrain the falling high specific gravity range granular material but sufficient to entrain any low specific gravity range granular material; subjecting the falling high specific gravity range granular material to the second airstream, so as to air-wash the falling high specific gravity granular material and remove any low specific gravity range granular material accompanying the falling high specific range gravity range granular material; and collecting the air-washed high specific gravity range granular material falling from the second airstream. Preferably, the step of incorporating the mixed granular material into the initial airstream, includes vacuuming up the mixed granular material into the initial airstream or mechanically dispensing the mixed granular material into the initial airstream. Preferably, the step of slowing the initial airstream bearing the suspended mixed granular materials to a second velocity, slower than the first velocity, includes providing a pre-exhaust, the provided pre-exhaust abruptly removing a portion of the initial airstream prior to an upwardly directed directional change of the airstream to approximately vertical and wherein the slowed initial airstream turns approximately vertical and wherein momentum of the suspended mixed granular material along with the slowed initial airstream carries the mixed granular material forward as the slowed initial airstream turns approximately vertical. Preferably, the slowing results from a percentage of the air removed by the provided pre-exhaust from the initial airstream in the range of from about 35% to about 50% of the volume of the initial airstream. Preferably, the initial airstream is confined within a first cross-sectional area and the step of slowing the initial airstream bearing the suspended mixed granular materials to a second velocity, slower than the first velocity, includes expanding the confining cross-sectional area to a second cross-sectional area, greater than the first cross-sectional area. Preferably, the second airstream, including any removed low specific gravity range granular material air-washed from the falling high specific gravity range material combines with the slowed, initial airstream including the suspended low specific gravity range granular material. Preferably, the low specific gravity range granular material is removed from the slowed initial airstream by further slowing the slowed initial airstream to a third velocity, the third velocity slower than the second velocity, such that the low specific gravity granular material falls from the third velocity airstream. The low specific gravity range granular material falling from the third velocity airstream is then collected. As explained previously, preferably, the mixed granular material to be specific gravity separated is pre-screened to a predetermined range of size. Preferably, the mixed granular material to be specific gravity separated has a pre-determined moisture content. This moisture content may be achieved by pre-drying. Alternatively, some moisture may be removed by incorporation into the initial airstream. Excessive moisture interferes with the incorporation into the initial airstream. Preferably, the high specific gravity range granular material may consist of various types of higher density components and the low specific gravity range material may consist of various types of lower density components. Preferably, the high specific gravity range granular material originates in a firearm projectile and the low specific gravity range material originates in a firing range backstop material. More preferably, the high specific gravity range granular material includes metallic lead and the low specific gravity range material originates in a firing range backstop material. In yet another embodiment, the present invention is a process for dry enrichment of a precious metal ore, the precious metal ore having a particle size distribution with an upper size limit and having fines below the upper size limit, the precious metal ore including rock and a precious metal having a density greater than the rock. The process includes the steps of: —providing an airstream for entraining the precious metal ore, the airstream having an entrainment velocity; —entraining and conveying the precious metal ore to a container using the airsteam at the entrainment velocity; —reducing velocity of the airstream to a lower velocity, the lower velocity insufficient to entrain at least the upper size limit particles of the particle size distribution of the precious metal ore, such that at least the upper size limit particles exit the airstream, while at least some of the fines remain entrained in the lower velocity airstream; and, —collecting the upper size limit particles exiting the airstream.

DETAILED DESCRIPTION OF THE INVENTION

For the purposes of this patent the terms defined in this section shall have the following meanings unless otherwise provided, described or indicated by the context.

Debris is defined as a mixture of one or more of the following: soil, inorganic materials such as silt, or sand and organic materials such as decomposing or decomposed leaves, grass clippings, plant clippings, seeds, sticks and weeds, all accompanied by varying amounts of moisture.

Landscape rock or rock is defined as any naturally occurring rock or stone, both as is or crushed, or similar man-made solid materials used as a landscape material, having a specific gravity of at least 1.25, and with the linear dimension of the particles ranging from about 0.5 inches to about 3.5 inches.

Solids are defined as any solid materials, including rock used for other purposes, both naturally occurring and man-made, which have a variety of end uses requiring cleaning or separation, with a specific gravity of at least 1.25.

Airflow or airstream are used interchangeably and are defined as a flow of air resulting from the application of vacuum which airflow or airstream may contain entrained rock, dirt or debris.

Throughout this description, an element referred to by a reference number has the characteristics and attributes described in association with that element wherever such element is referred to unless specifically directed otherwise.

Figure 1:
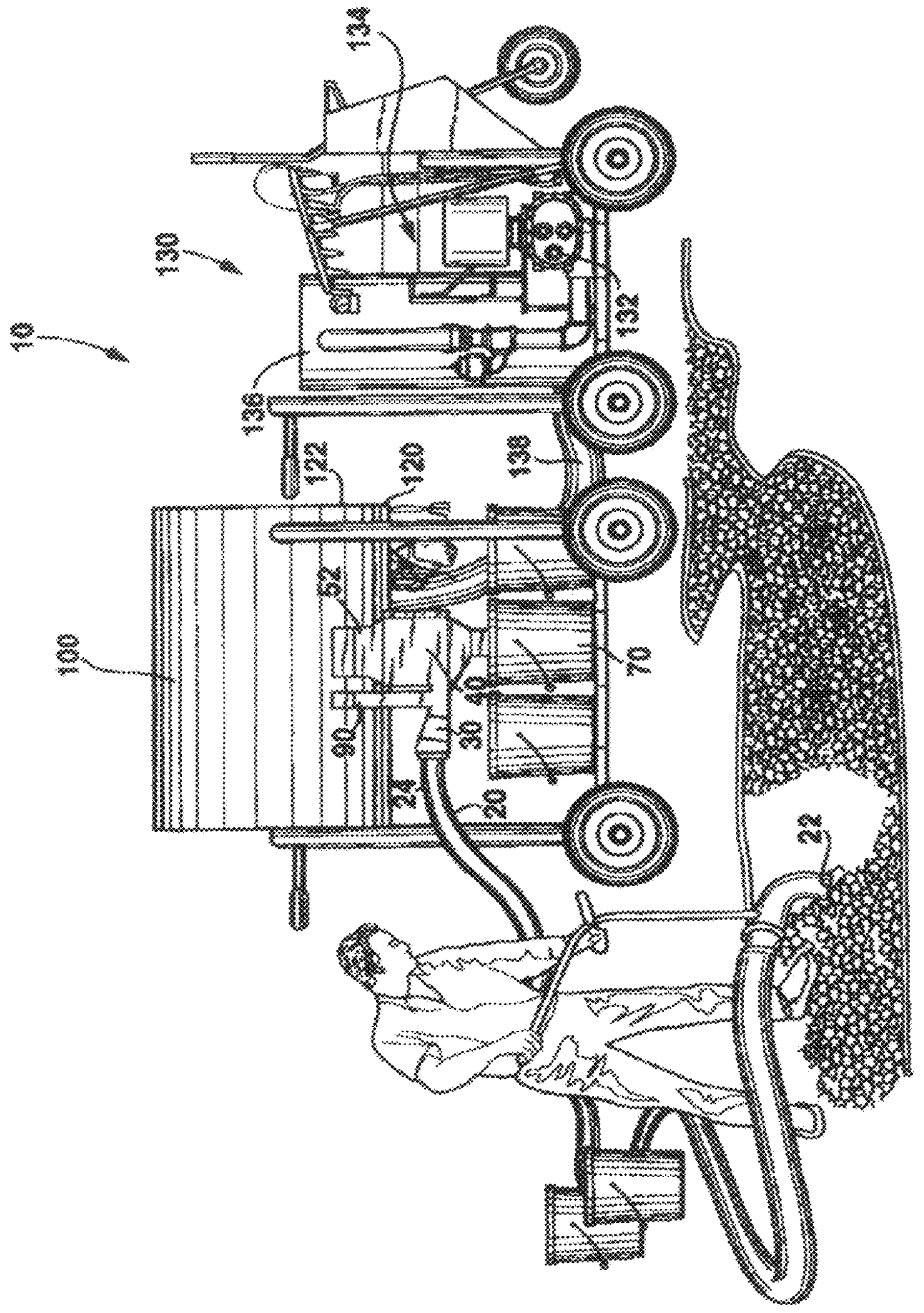
FIG. 1 is a side view of one embodiment of the present invention in use.

First an overview of the invention is presented followed by a detailed description of the invention. The invention is an apparatus, generally labeled 10, for on-site cleaning of landscape rock as shown in FIG. 1. By cleaning of landscape rock we mean that the landscape rock is being separated from the dirt and debris that had accumulated in the interstitial spaces around the individual rocks and that was also picked up by the vacuum. The apparatus 10 can, of course, be used to clean other solids. The apparatus 10 can also be set up to operate at a fixed location where rock or solids are brought to it rather than bringing the apparatus 10 to a site.

The apparatus 10 operates under vacuum and, in one embodiment, includes the following main elements. An intake 20 suctions rock and associated debris off the ground and conveys it either directly to a rock-debris separator chamber 40 or to the rock-debris separator chamber 40 through an entry section 30 (FIG. 1). The flow is preferably directed in a slightly downward direction as it passes through entry section 30 to chamber 40. Rock impacting the inner walls of intake 20, entry section 30, if used, and chamber 40 as well as inter-rock collisions and turbulent airflow serves to dislodge adhering debris from the rock. Ambient air is drawn into the lower part of chamber 40 or into chamber collector means 70 below chamber 40 through chamber air supply means 80 (FIG. 3), which includes a valve to control the flow of ambient air, and flows generally upward toward a chamber exhaust outlet 52 in the chamber top portion 50 of the chamber 40. Rock traveling and falling through chamber 40, and chamber discharge outlet 56 passes through this generally upward flow of air that entrains the lighter debris but not the denser rock. Consequently, the cleaned rock continues on a downward path where it is accumulated in chamber collector means 70 and is ready to be put back in place.

The settling of rock in chamber 40 is facilitated by a reduction of the velocity of the flow in chamber 40 by use of a pre-exhaust 90 abruptly withdrawing air from entry section 30 or chamber 40 and the greater size of chamber 40 relative to intake 20 and entry section 30.

An air-debris separator cell 100 is provided to remove debris from the airflow moving from pre-exhaust outlet 94 and chamber exhaust outlet 52. The air-debris separator cell 100 is designed so the debris settles out of the air by gravity and is collected separately for periodic removal.

A vacuum means 130 creates a vacuum to establish the necessary airflow in apparatus 10. The function of the vacuum means 130 is to draw ambient air into apparatus 10 through intake means 20, chamber air supply means 80, and auxiliary chamber air supply means 82, resulting in the rock and debris being picked up and transported through the apparatus 10, the rock being cleaned by separating rock from the debris, and the rock and debris being collected separately. Vacuum means 130, which includes a dust collector 136, discharges to the atmosphere.

Because damp debris is prone to adhering to the inner surfaces of the apparatus 10 when the air stream carrying the debris impacts the surfaces at a high velocity and/or at an acute angle, several measures, each of which is an independent invention, have been taken in the design of the apparatus 10 to minimize this problem. They include: removing the debris from the air stream as quickly as possible by the use of an air-debris separator cell 100 situated directly above the chamber 40; keeping connecting conduits as short and straight as possible; avoiding, as much as possible, the high velocity contact of debris-containing air streams directly onto the inner surfaces of the apparatus 10; provision of an auxiliary chamber air supply means 82 into the chamber 40, and the use of flexible impaction shields 84 and 86 as will be described hereafter.

Figure 2:
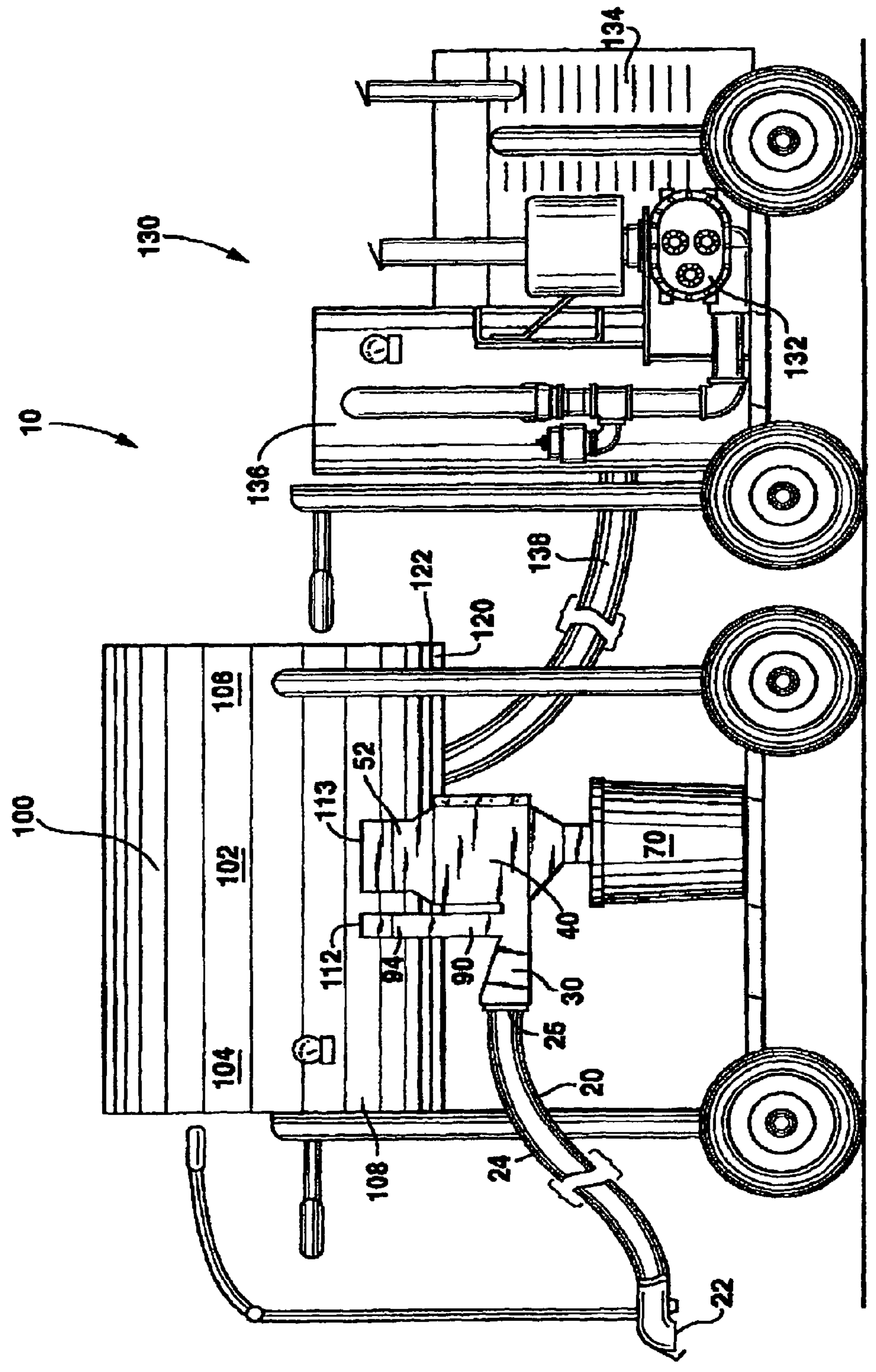
FIG. 2 is a side view of the embodiment of the invention of FIG. 1.

A detailed description of the invention follows. Those portions of the apparatus 10 in contact with rock must be made of durable materials able to resist the abrasion and impact of the moving rock. In the preferred embodiment of the invention, rock and associated debris are suctioned into the apparatus 10 through intake 20 (FIG. 2), which comprises a hose 24 having a head 22 at one end and an outlet 25 at the other end. The head 22 picks up rock and debris and provides entry to the hose 24 and the remainder of the apparatus 10. Head 22, hose 24 and outlet 25 must be of a size to receive the rock.

Figure 3:
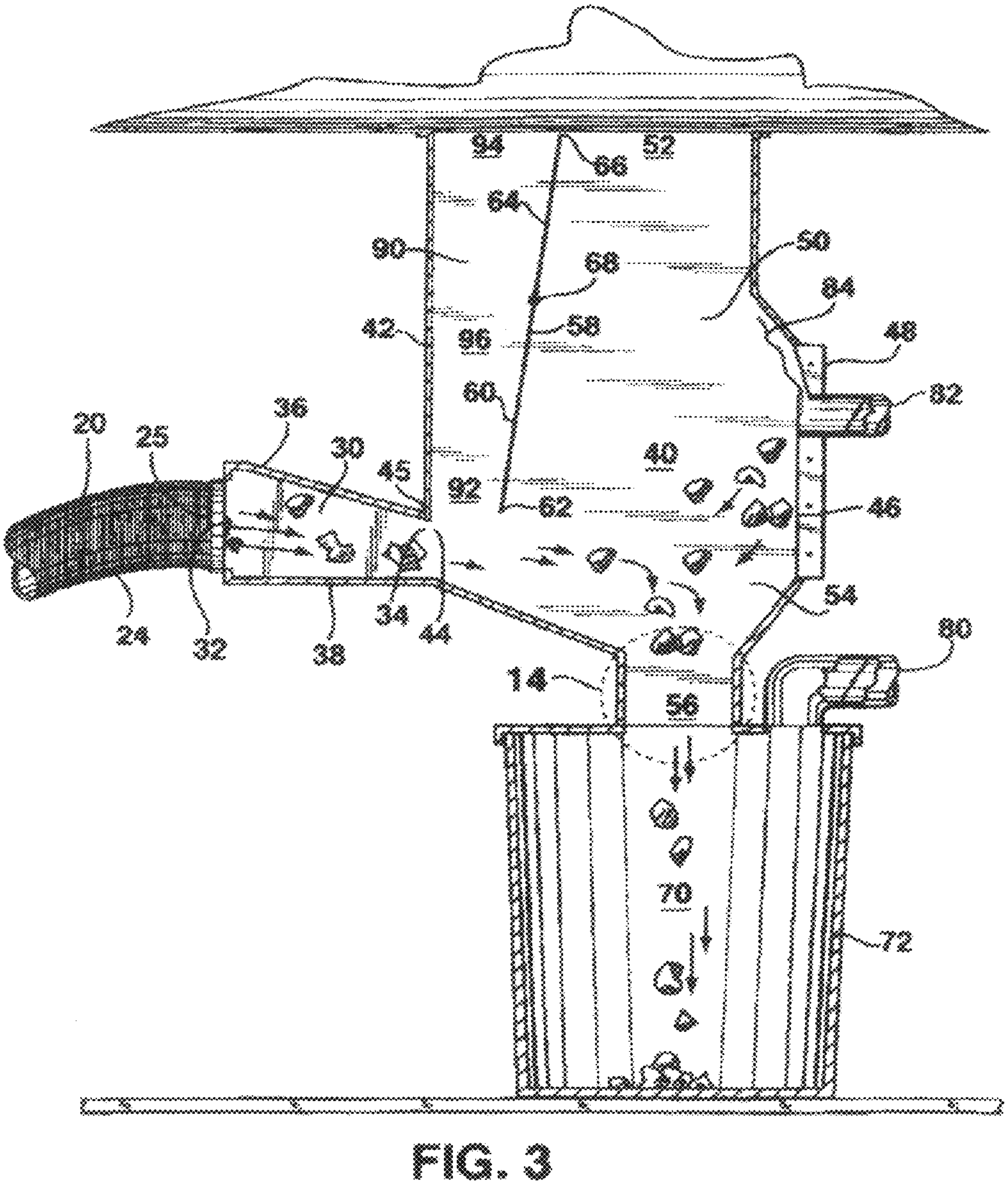
FIG. 3 is a side cross-sectional view of an embodiment of the rock debris separator chamber and collection container of the invention of FIG. 1.
Figure 4:
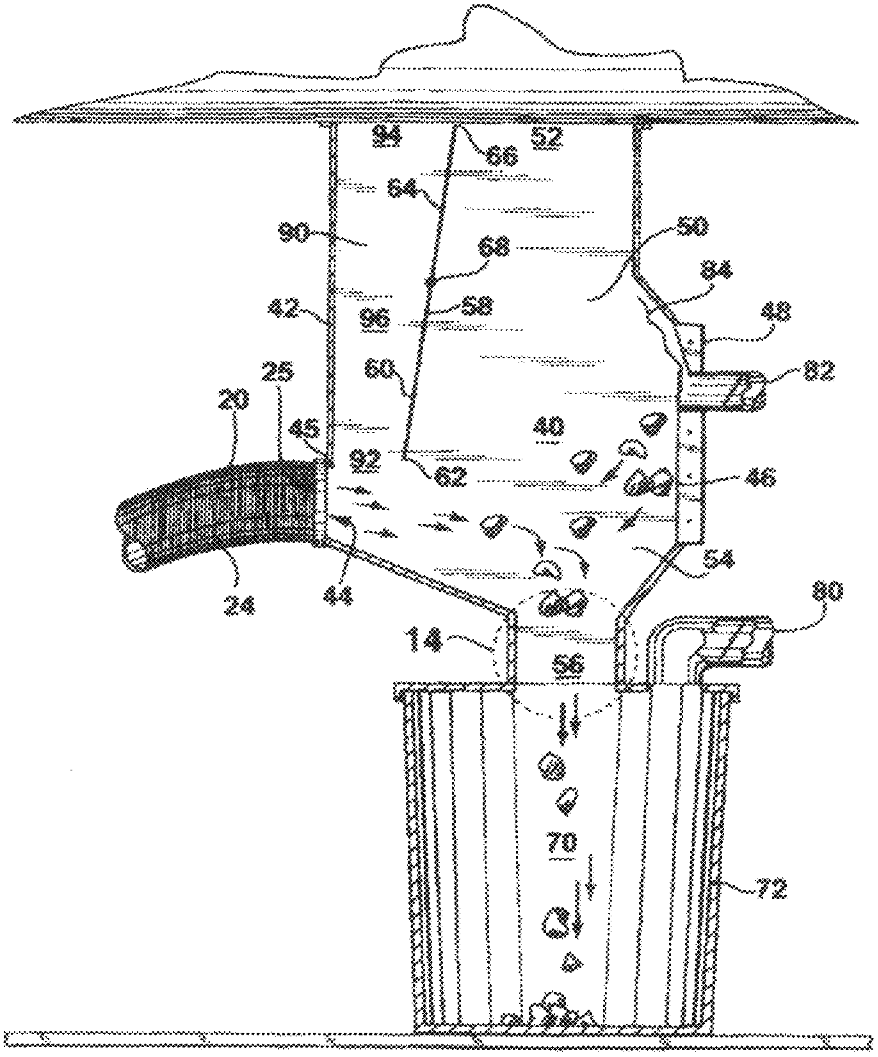
FIG. 4 is a side cross-sectional view of another embodiment of the chamber and collection container of the invention of FIG. 1.

Hose 24 can be a hose, conduit or a flexible assembly of rigid metal or plastic piping configured to allow the head 22 to move in three dimensions. The hose 24 connects through outlet 25 to an entry section 30 (FIG. 3) or directly to rock-debris separator chamber 40 (FIG. 4). Entry section 30, as shown in FIG. 3, is not required for the apparatus 10 to function, but it is preferred. Entry section 30 is horizontally disposed and comprises an entry section inlet 32, an entry section outlet 34 opposite the entry section inlet 32, an entry section top portion 36 and an entry section bottom portion 38. The entry section inlet 32 receives the flow from hose 24 at outlet 25. The entry section outlet 34 discharges the flow from entry section 30 to rock-debris separator chamber 40. The entry section top portion 36 generally slopes downward from the horizontal toward the entry section bottom portion 38 from the entry section inlet 32 to the entry section outlet 34, guiding the flow downward from the horizontal direction thereby imparting a downward component to the direction of flow leaving the entry section outlet 34 if an entry section 30 is employed.

A rock-debris separator chamber or chamber 40 separates debris from rock as shown in FIGS. 3 and 4. Chamber 40 comprises a chamber inlet side 42 with a chamber inlet 44 having a chamber inlet uppermost point 45, a chamber opposite side 46 opposite the chamber inlet side 42, a chamber access 48, a chamber top portion 50 having a chamber exhaust outlet 52, a chamber bottom portion 54 having a chamber discharge outlet 56 and a chamber partition 58.

FIG. 4 shows an embodiment of the apparatus 10 with the entry section 30 removed. In this embodiment, the hose 24 is connected directly to the chamber inlet side 42.

The chamber inlet 44 is oriented approximately vertically and is preferably part of and parallel to the chamber inlet side 42 in the immediate vicinity of chamber inlet 44. The chamber inlet 44 has a chamber inlet uppermost point 45 at the highest elevation of chamber inlet 44. The chamber inlet 44 receives flow from the entry section outlet 34 if an entry section 30 is used (FIG. 3) or from hose 24 outlet 25 if directly connected to intake 20 (FIG. 4). The chamber bottom portion 54 slopes downward toward the chamber discharge outlet 56. The chamber discharge outlet 56 extends downward from the chamber bottom portion 54. A chamber access 48 is disposed on the chamber 40 to provide access to the inside of chamber 40 from outside chamber 40. The chamber access 48 includes a sealed removable cover or hatch to provide access to the inside of chamber 40 for inspection, cleaning and repair.

Pre-exhaust 90 abruptly withdraws a portion of the air entering the apparatus 10 through the intake 20 to reduce the velocity of the remaining flow in chamber 40. Pre-exhaust 90 comprises a pre-exhaust inlet 92 proximate the chamber inlet 44, a pre-exhaust outlet 94 opposite the pre-exhaust inlet 92 and a pre-exhaust midsection 96, a closed conduit connecting the pre-exhaust inlet 92 to the pre-exhaust outlet 94. The pre-exhaust inlet 92 is located near the chamber inlet 44 and directs a portion of the airflow entering the intake 20 into the pre-exhaust midsection 96 where it is directed to the pre-exhaust outlet 94.

Pre-exhaust 90 is formed, in part, by chamber partition 58. Chamber partition 58 can have many shapes and configurations including a simple plane that approximately faces the chamber inlet 44. FIGS. 3 and 4 show the preferred embodiment with the chamber partition, 58 having a partition lower portion 60 with a partition lower edge 62 both below a partition upper portion 64 with a partition upper edge 66. The function of the chamber partition 58 is to split the airflow entering chamber 40 through chamber inlet 44 and forms in part the pre-exhaust 90.

The partition upper portion 64 is pivotally connected to partition lower portion 60 at pivot point 68 so that partition upper portion 64 can be rotated to control the relative flow areas on each side of the partition upper portion 64 in the chamber exhaust outlet 52. Partition lower edge 62 is generally horizontal and set preferably at or slightly above the elevation of the chamber inlet uppermost point 45 so that most if not all of the passing rock does not impact the partition lower edge 62 or partition lower portion 60. Partition lower edge 62 could be set higher, as high as proximate the chamber top portion 50, but with diminishing effect. Partition lower edge 62 could also be set lower than the preferred elevation, but would then be exposed to the impact of rock and debris.

The pre-exhaust inlet 92 in this preferred embodiment is a planar area formed by a plane through and bounded by the partition lower edge 62 and chamber inlet uppermost point 45 and the intersection of that plane with the chamber inlet side 42. Pre-exhaust outlet 94 is formed within the chamber exhaust outlet 52 and is a planar area formed by the partition upper edge 66 and the chamber exhaust outlet 52 on the chamber inlet side 42 of the chamber exhaust outlet 52. The pre-exhaust mid-section is bounded by chamber partition 58 and the chamber inlet side 42, and by the pre-exhaust inlet 92 and the pre-exhaust outlet 94.

Figure 5:
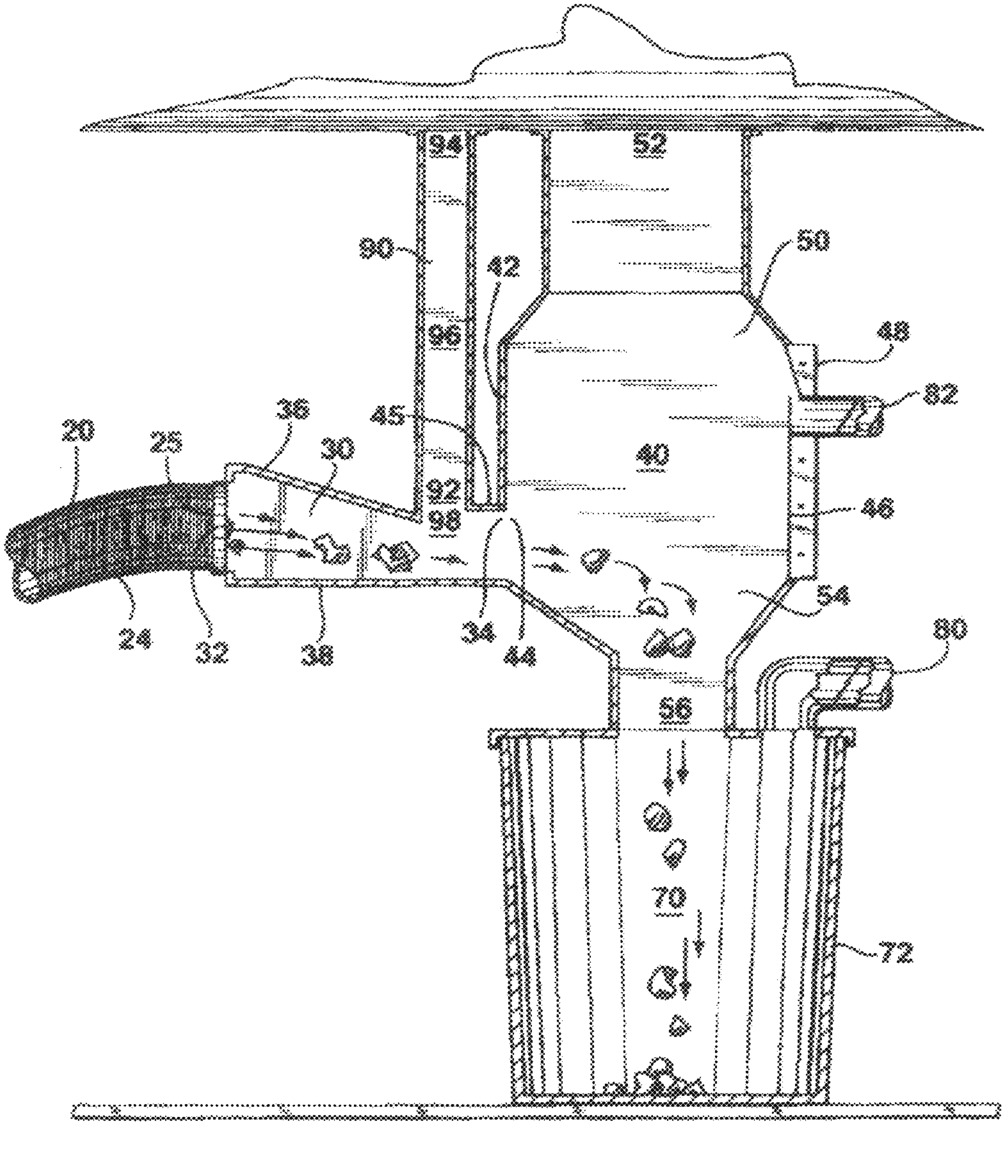
FIG. 5 is a side cross-sectional view of another embodiment of the chamber and collection container of the invention of FIG. 1.

There are three other embodiments of the pre-exhaust 90 that do not require the chamber partition 58 to form the pre-exhaust 90. A second embodiment shown in FIG. 5, includes an entry section 30 with an entry section pre-exhaust outlet 98 connected to a pre-exhaust inlet 92 to abruptly withdraw air from the entry section 30 between the entry section inlet 32 and the entry section outlet 34. The pre-exhaust midsection 96 may be a structure separate from chamber 40 depending on the proximity of the entry section pre-exhaust outlet 98 to chamber 40.

Figure 6:
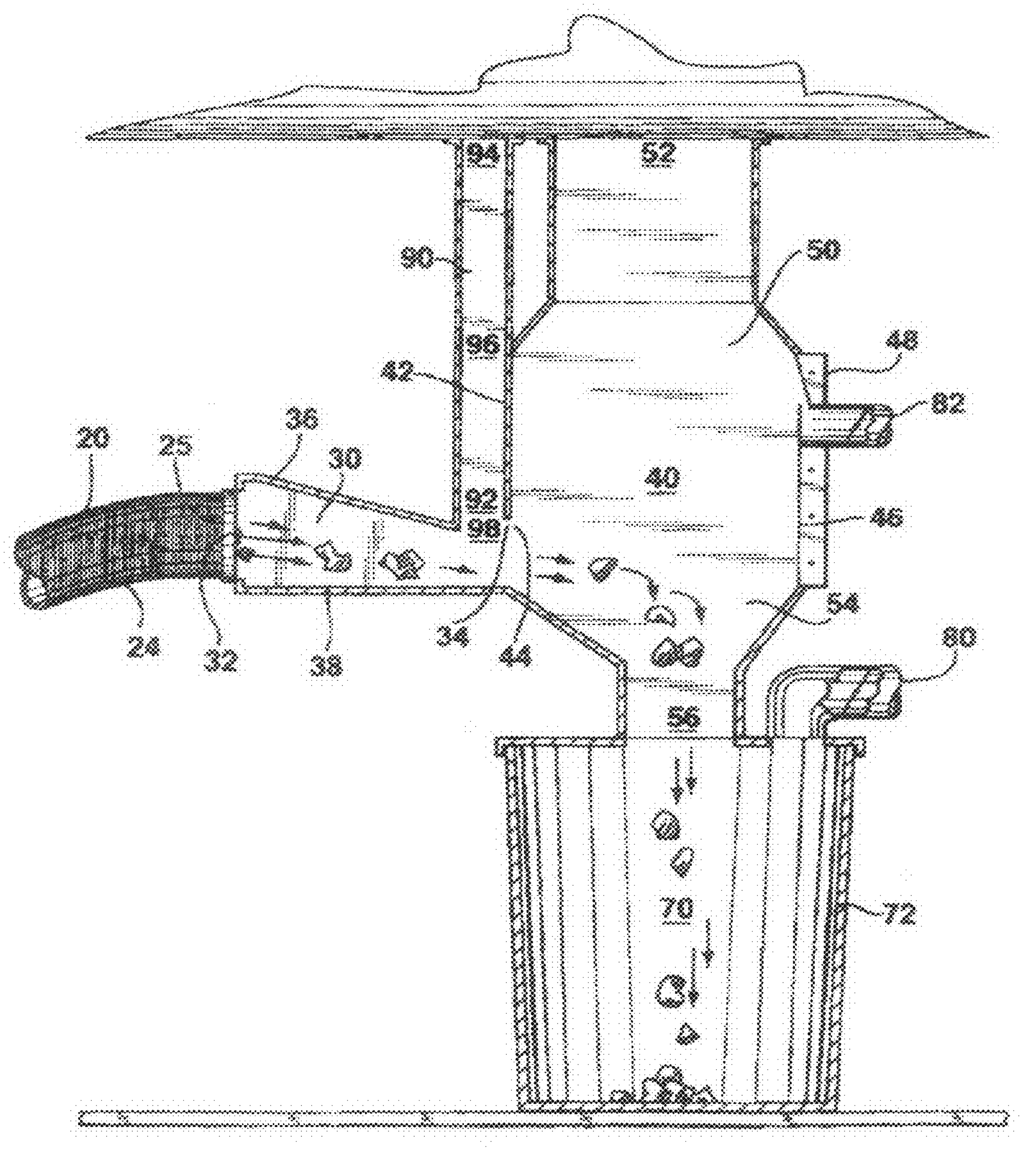
FIG. 6 is a side cross-sectional view of another embodiment of the chamber and collection container of the invention of FIG. 1.

A third embodiment shown in FIG. 6 is a special case of the second embodiment and includes the entry section pre-exhaust outlet 98 immediately adjacent to the entry section outlet 34 next to the chamber inlet side 42. Entry section pre-exhaust outlet 98 is connected to a pre-exhaust inlet 92 to abruptly withdraw an air steam from the entry section 30 proximate the chamber inlet side 42. The pre-exhaust midsection 96 may have a portion in common with chamber 40 along part or all of its length.

Figure 7:
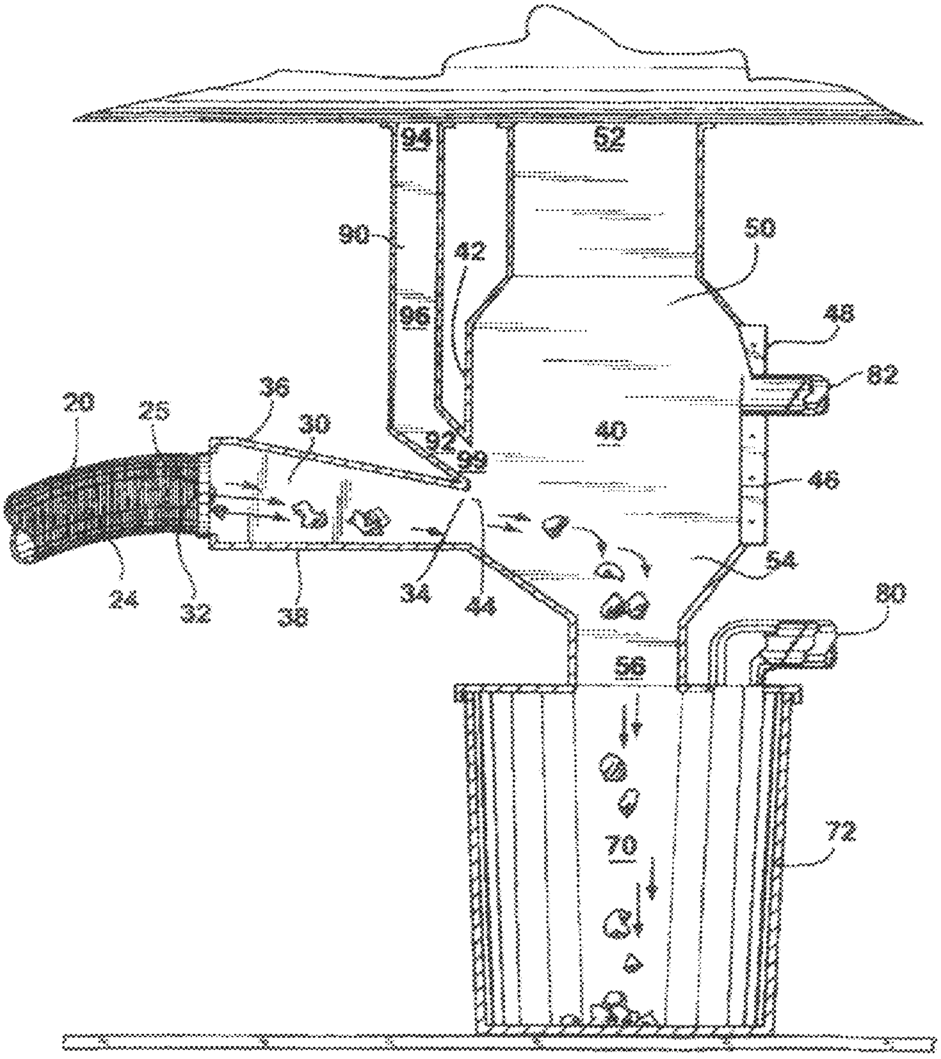
FIG. 7 is a side cross-sectional view of another embodiment of the chamber and collection container of the invention of FIG. 1.

The fourth embodiment, shown in FIG. 7, includes a chamber inlet side exhaust outlet 99 proximate the chamber inlet 44 and connected to the pre-exhaust inlet 92 for the abrupt withdrawal of air from the chamber 40 proximate the chamber inlet 44. The pre-exhaust midsection 96 can be adjacent to or separate from the chamber 40.

Now, turning to the other elements connected to the chamber 40, a chamber collector means 70 is disposed adjacent to and below the chamber discharge outlet 56. The chamber collector means 70 comprises a collection container 72 such as a common five gallon pail which is removable and has an airtight connection to the chamber discharge outlet 56 when the apparatus 10 is operating. Alternatively, the chamber collector means 70 may be one or more integral hoppers that discharge to other containers or onto a conveyer.

Figure 14:
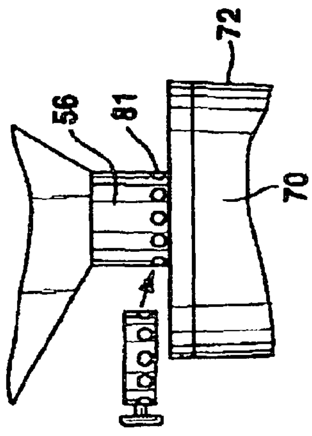
FIG. 14 is a side view of a component of one embodiment of the invention.

A chamber air supply means 80, FIGS. 3 and 4, draws ambient air into the chamber discharge outlet 56 through collection container 72 by one or more adjustable inlets such as orifices or nozzles. Alternatively, or in conjunction with chamber discharge outlet 56 (FIG. 14), ambient air is drawn directly into chamber discharge outlet 56 by one or more adjustable inlets 81 such as orifices or nozzles. The purpose for the introduction of air that flows upward and countercurrent to the rock falling through the chamber discharge outlet 56 is to entrain debris but not the denser rock. Further, this vertical airflow influences the transition to totally vertical flow transporting debris from chamber 40. An auxiliary chamber air supply means 82, shown in FIGS. 3 and 4, comprises one or more adjustable air inlets such as nozzles and orifices. Auxiliary chamber air supply means 82, shown in FIG. 3, directs an airflow into chamber 40 such as through the chamber opposite side 46 and works in conjunction with chamber flexible impaction shield 84 to minimize the build up of debris within chamber 40.

Figure 8:
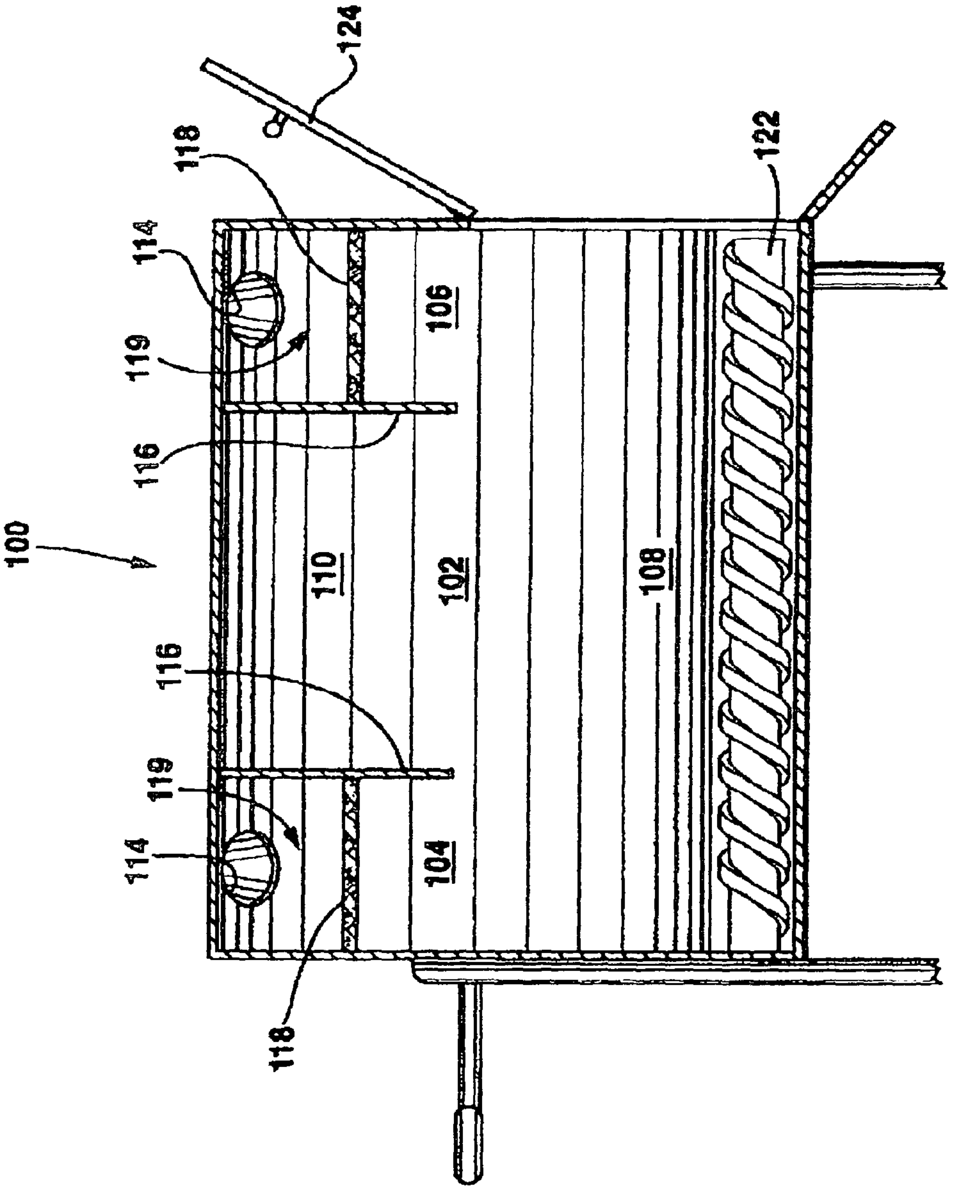
FIG. 8 is a side cross-sectional view of the air-debris separator cell of the invention of FIG. 1.

An air-debris separator cell 100 shown in FIG. 8 is preferably interposed between chamber 40 and vacuum means 130. Air-debris separator cell 100 reduces the concentration of debris in the flow from the pre-exhaust outlet 94 and the chamber exhaust outlet 52 by decreasing the velocity of the flow within air-debris separator cell 100 to allow gravity settling of debris out of the air before discharge from air-debris separator cell 100. Further, air-debris separator cell 100 is positioned as in FIGS. 9 and 10, adjacent to and above chamber 40, resulting in a short and straight run of conduit between the rock-debris chamber 40 and the air-debris separator cell 100.

Figure 26:
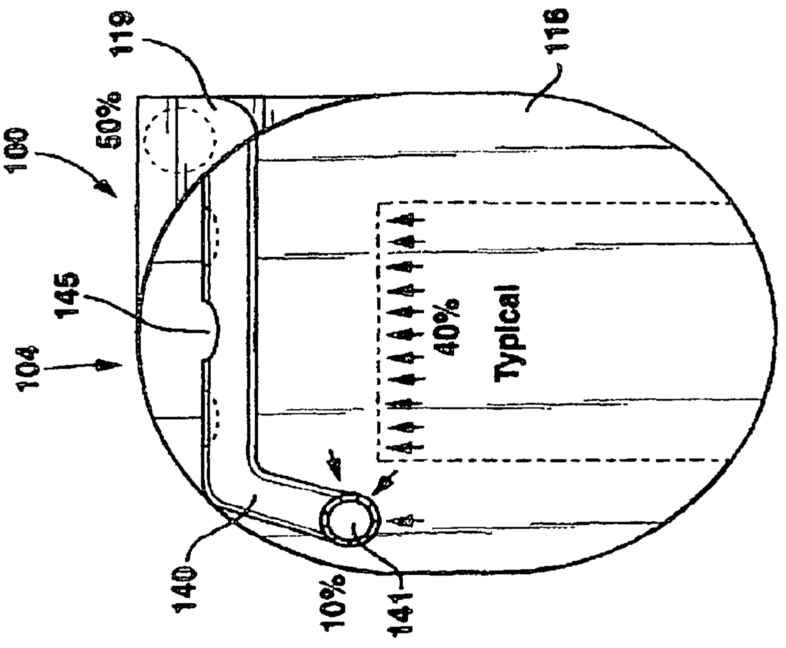
FIG. 26 is a cross-sectional end view of the air-debris separator of FIG. 17 at a particular location along the air-debris separator.
Figure 28:
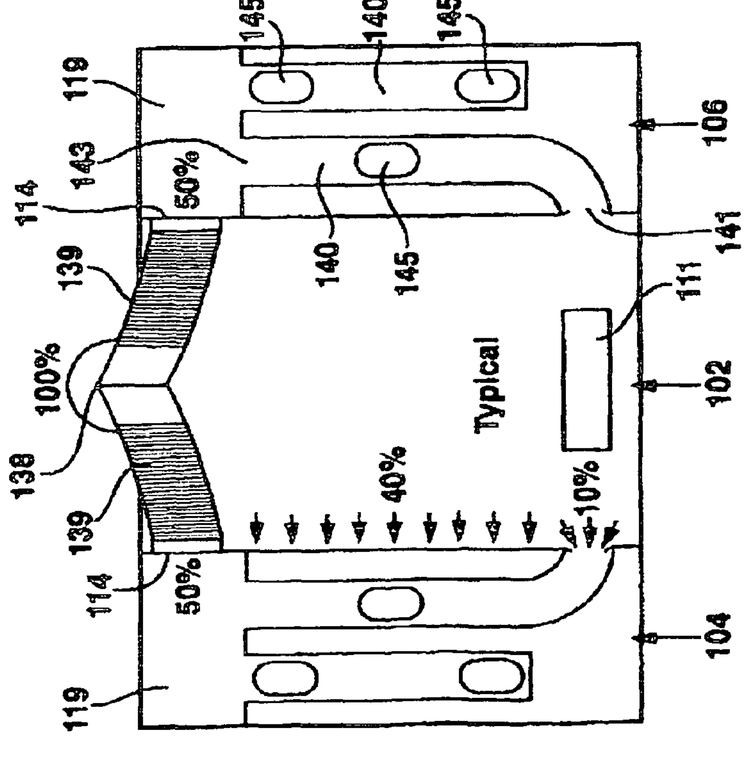
FIG. 28 is a phantom top view of the air-debris separator of FIG. 17.

The air-debris separator cell 100 comprises a cell middle section 102, a first end section 104, a second end section 106, a cell bottom portion 108, a cell top portion 110, a vertical baffle 116, a cell exhaust plenum 119 with associated inlet duct 140 that enters into the plenum 119 at 143 (FIGS. 26 and 28), filter 118 and exhaust outlet 114. Inlet duct 140 has inlets 145 and 141. There is a cell pre-exhaust inlet 112 to receive flow from pre-exhaust outlet 94 and a cell chamber exhaust inlet 113 to receive flow from chamber exhaust outlet 52, as shown in FIG. 10, or a single cell inlet 111 if the pre-exhaust outlet 94 and chamber exhaust outlet 52 are combined prior to entering the air-debris separator cell 100, as shown in FIG. 9.

To simplify the remaining description concerning the air-debris separator cell 100 only the single cell inlet 111 embodiment is described but the same description applies as well to the embodiment of air-debris separator cell 100 with the cell pre-exhaust inlet 112 and separate cell chamber exhaust inlet 113.

Figure 9:
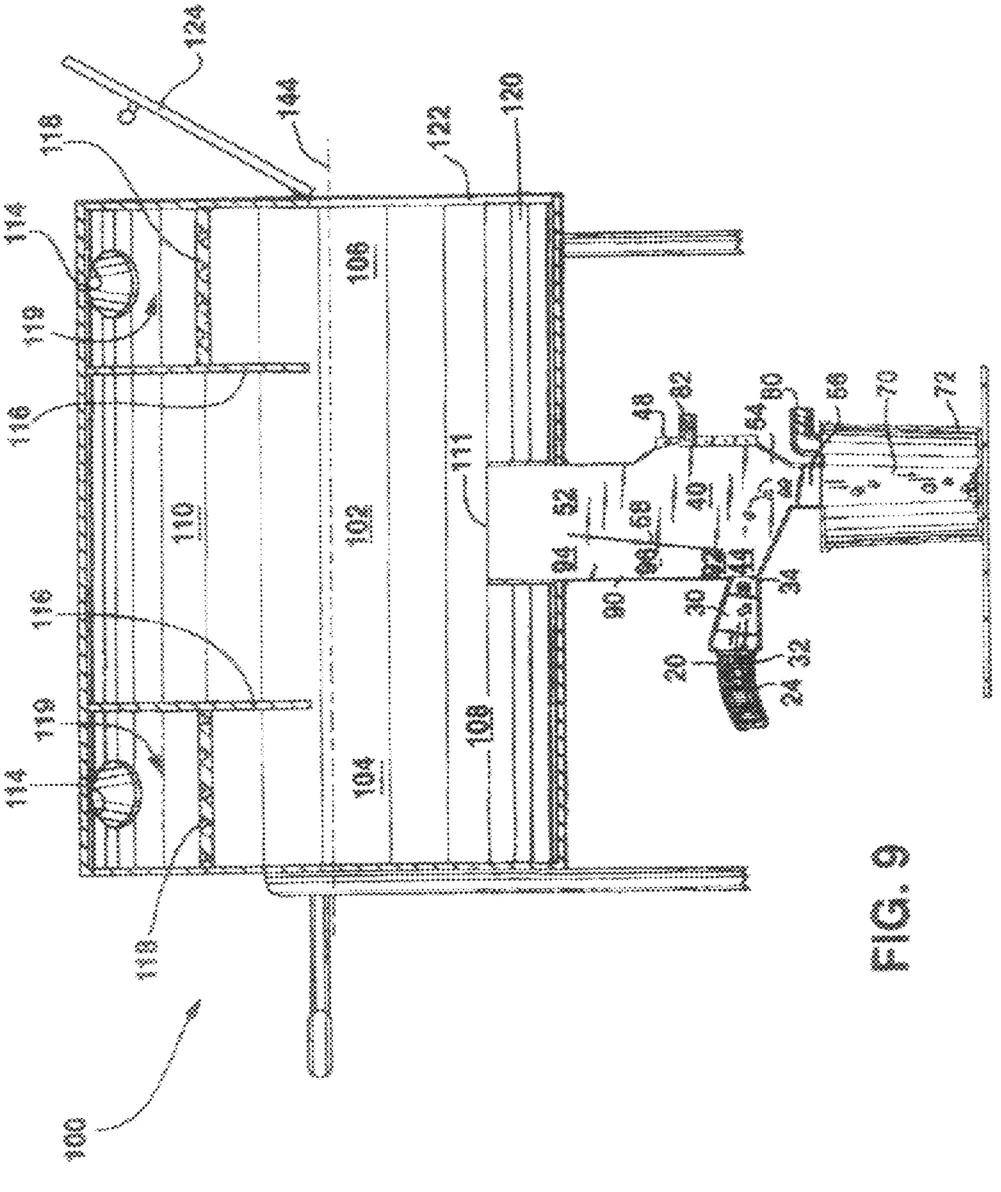
FIG. 9 is a side cross-sectional view of the chamber, collection container and air-debris separator cell of the invention of FIG. 3.
Figure 10:
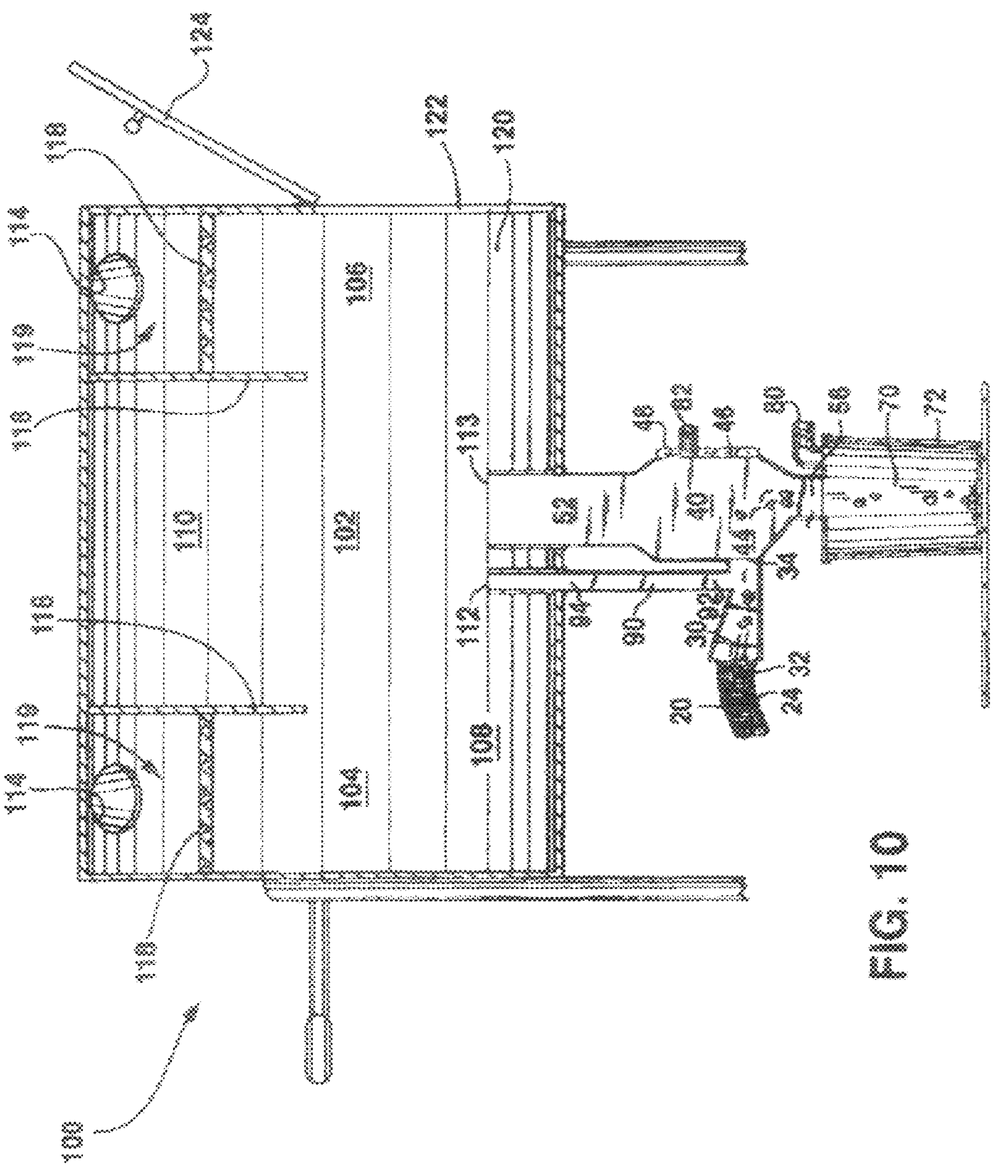
FIG. 10 is a side cross-sectional view of the chamber, collection container and air-debris separator cell of the invention of FIG. 5.
Figure 12:
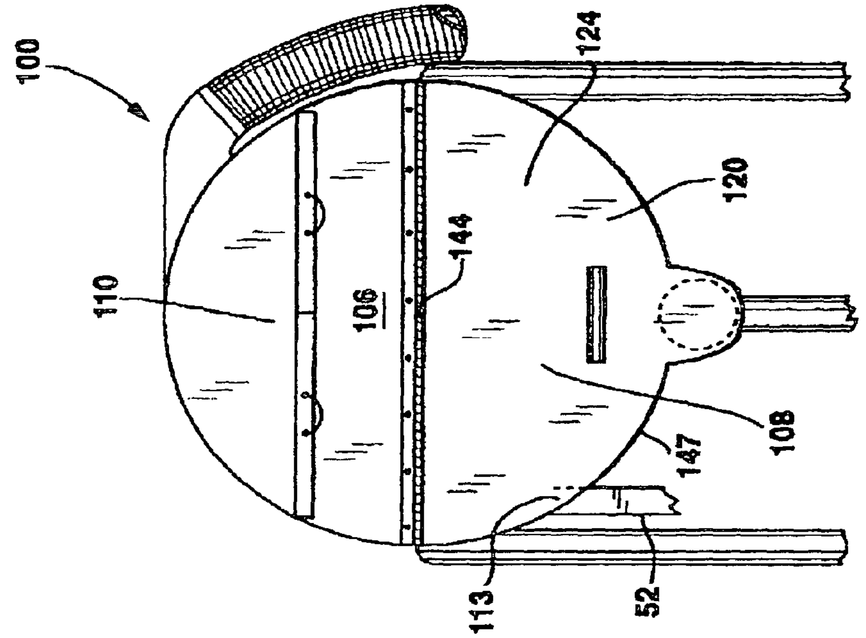
FIG. 12 is an end view of the air-debris separator cell of the invention of FIG. 1 opposite the end of FIG. 11.
Figure 11:
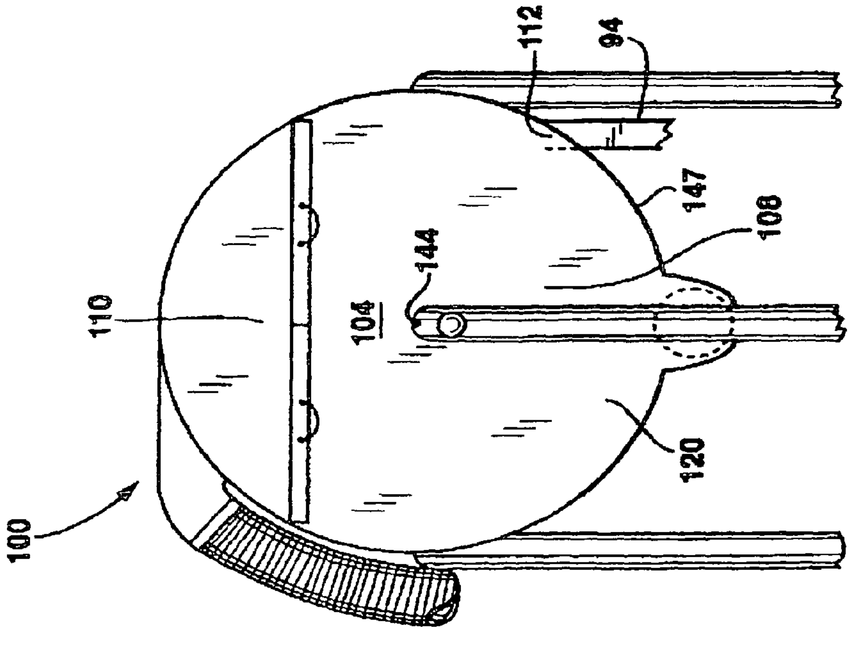
FIG. 11 is an end view of the air-debris separator cell of the invention of FIG. 1.

FIGS. 9, 11 and 12 show embodiments of air-debris separator cell 100. Although air-debris separator cell 100 can assume many shapes and cross-sectional area configurations, here air-debris separator cell 100 is substantially a closed oval cylinder with a horizontal axis 144. The cylindrical shape of the air-debris separator cell 100 produces an outer circumference 147 when viewed from the end of the air-debris separator cell 100. This circumference 147 is defined by a radius extending from the horizontal axis 144 to the circumferential surface of the air-debris separator cell 100. This cylindrical shape also adds rigidity to the air-debris separator cell 100, and in combination with the rock-debris separator chamber 40, forms a rigid frame that allows the entire apparatus 10 to have a compact and therefore highly mobile configuration. The rigidity of the air-debris separator cell 100 also allows it to be able to accommodate a range of debris removal means 122, particularly an auger.

Two vertical baffles 116 are disposed in the cell top portion 110 that extend downward from top portion 110 toward cell bottom portion 108, forming cell middle section 102, first end section 104 on one side of cell middle section 102, and a second end section 106 on the opposite side of cell middle section 102.

Air-debris separator cell 100 may have many possible arrangements of cell inlet 111 and cell exhaust outlet 114. Here cell inlet 111 is approximately vertical and disposed in the cell bottom portion 108 of the cell middle section 102 and extends into air-debris separator cell 100. The vertical cell inlet 111 is further located to enter air-debris separator cell 100 at a point on the circumference of the bottom portion 108 such that the vertical extension of the centerline of cell inlet 111 intersects the radius from the axis 144 at a point within about 70-90 percent of the distance along the radius from the axis 144.

A cell exhaust plenum 119 containing exhaust outlet 114 is disposed internal or external of cell top portion 110 of first end section 104 and a second exhaust plenum 119 and exhaust outlet 114 is similarly disposed in the second end section 106. Exhaust plenum inlet comprises filter 118 or an array of inlets 145 and 141 connected by ducts 140 to the exhaust plenum and disposed in the cell top portion 110 of each end section 104 and 106 (FIGS. 9, 26, 27 and 28). The cell exhaust plenum outlets 114 are fluidly connected to the vacuum means 130 through an air-debris separator vacuum manifold 139 connected to a main vacuum conduit 138 that is in turn connected to the vacuum means 130. The air-debris separator vacuum manifold 139 and main vacuum conduit 138 may take many forms clear to those skilled in the art so long as the cell exhaust plenum outlets 114, and consequently the cell exhaust plenum 119, are fluidly connected to the vacuum means 130.

In the preferred embodiment of the invention, shown in FIG. 9, 10 and elsewhere, the velocity of the airflow in the air-debris separator cell 100 is slowed substantially by the airflow entering the large air-debris separator cell 100 at cell inlet 111. As the airstream enters the air-debris separator cell 100, the greater volume of the air-debris separator cell 100 causes the cross-sectional area of the airstream to increase which causes the airstream velocity to slow down, which in turn causes the airstream to lose much of its ability to move the entrained debris along with the airstream. As a result, the entrained debris falls to the bottom of the air-debris separator cell 100.

In essence, the flow into the air-debris separator cell 100 has the highest velocity at the point of entry into the air-debris separator cell 100 at cell inlet 111, from which the flow disperses rapidly, follows the inner surface of the cell middle section 102 of the air-debris separator cell 100, rising initially (i.e., moving toward the cell top portion 110) then turning and flowing downward (i.e, moving toward the cell bottom portion 108). As the airflow moves downward, it separates increasingly into two streams, each of which flows under a vertical baffle 116 and then upward (i.e., moving toward the cell top portion 110) through filter 118 or inlet ducts 140 through exhaust plenum 119 to the cell exhaust outlet 114 (FIGS. 9, 26, 27 and 28). The momentum of the debris being carried downward in airstreams that turn upward, combined with the effect of gravity, causes settling to take place. The filter 118, if used, not only serves to capture light bulky debris such as pieces of leaves, but it provides a pressure drop through filter 118 that results in a more uniform flow over the cross-section of filter 118 and through end sections 104 and 106, which in turn results in further gravity settling to take place within end sections 104 and 106.

Figure 13:
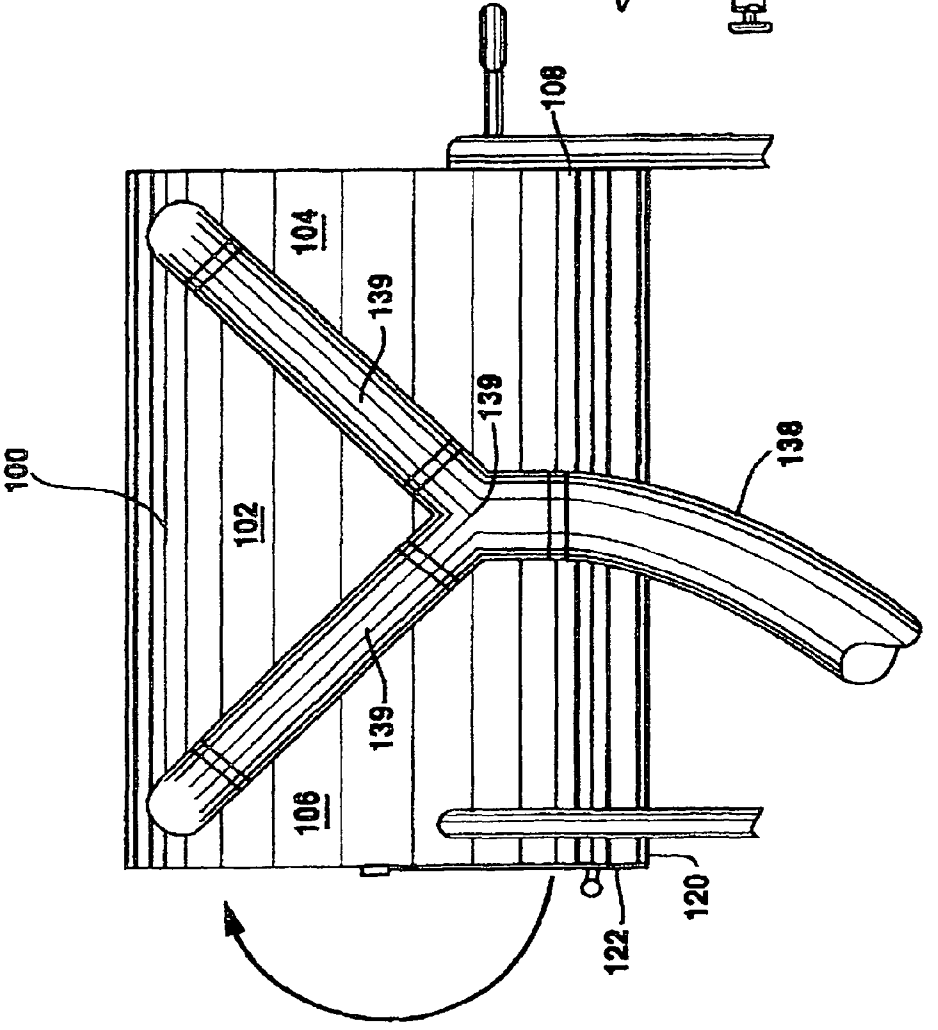
FIG. 13 is a side view of another embodiment of the invention.

A cell collector 120, shown in FIGS. 11, 12 and 13, is disposed in the cell bottom portion 108 and collects the separated and settled debris. A cell debris removal means 122, shown in FIGS. 13 and 23, removes the collected debris as needed. A cell access 124 allows entry into the air-debris separator cell 100 and access to the cell collector 120 and the cell debris removal means 122.

As explained above, the airstream velocity slows upon entering the large volume of the air-debris separator cell 100, and also by friction with the inner wall of the air-debris separator cell 100. In conjunction with the physical location of cell inlet 111 in the cell bottom portion 108, it has been found to be desirable to make the air-debris separator cell 100 somewhat elongated in the vertical direction so that the airstream entering the air-debris separator cell 100 at cell inlet 111 has a greater distance or time to disperse before contacting the inner wall of the cell top portion 110 of the air-debris separator cell 100. The greater vertical dimension also favors gravity settling by allowing more time for the debris to settle out of the airflow before the air is exhausted from air-debris separator cell 100.

An alternative is provided to filter 118 being used as an inlet to exhaust plenum 119. The filter 118 provides an even distribution of airflow in end section 104 and 106, as previously stated, but may require a high level of filter maintenance in some applications. The preferred embodiment (FIGS. 26, 27, 28 and 29) employs one or more inlet ducts 140 connected to each exhaust plenum 143 in the top portion 110 of each end section 104 and 106 and includes inlets 145 and optional inlet 141. Vertical baffles 116 define the boundary between the middle section 102 and the first and second end sections 104 and 106 respectively. The air and debris that transitions from cell middle section 102 to end sections 104 and 106 flows through a large opening or expanse under vertical baffle 116 in the cell bottom portion 108 and also through an optional outlet in baffle 116 located 90 degrees from cell inlet 111 flow. Inlet ducts 140 have inlets 145 strategically sized and located to balance the vertical airflow out of each end section 104 and 106, and an optional inlet 141 connected directly through baffle 116.

The purpose of inlet 141 is to remove a portion of the air directly from cell middle section 102 to reduce the rate of flow of the remaining airflow moving under vertical baffle 116, thus increasing the opportunity for the entrained debris to fall to the cell collector 120. The air removed through inlet 141 is relatively void of heavy particulates because the air is extracted from the side of the entering airflow and the momentum of the debris is aligned with and in the same direction of the main airflow.

Using inlet ducts 140 as described with the optional but preferred inlet 141, it is believed that about 70-90% of the air entering the air-debris separator cell 100 passes below vertical baffle 116 through the cell bottom portion 108 and about 10-30% through baffle 116 at inlet 141 and consequently out of the air-debris separator cell 100. Using inlet ducts as described without optional inlet 141, 100% of the air entering the air-debris separator cell 100 passes below vertical baffle 116.

Figure 29:
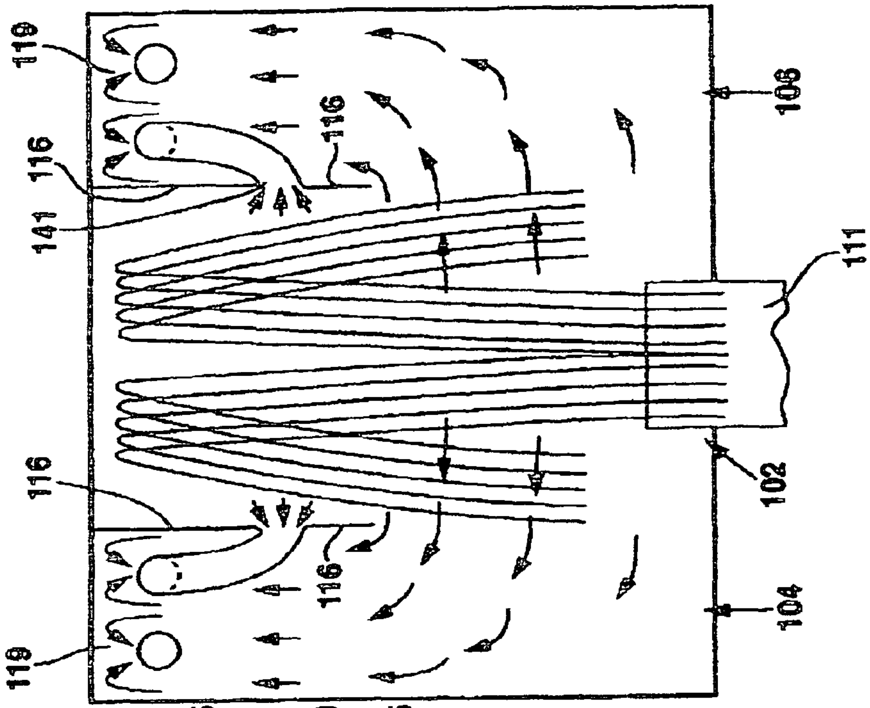
FIG. 29 is a phantom side view of the air-debris separator of FIG. 17 showing the flow of air and debris when the invention is in operation.

This movement of air from the cell inlet 111 around the inside of the air-debris separator cell 100 is shown in FIG. 29. As can be seen, the airstream entering the air-debris separator cell 100 generally follows the inner contour of the cell entering in an upward direction and then turns downward between the baffles 116. The airflow then splits, moving toward and under baffles 116, and into end sections 104 and 106. By "splits", we mean that a portion of the air is directed in one direction and the remaining portion directed in another direction. Thereafter, the airstream moves toward exhaust plenum inlet duct inlets 145 or the filter 118 if used and toward the vacuum means 130 through the air-debris separator vacuum manifold 139 and vacuum conduit 138.

Figure 20:
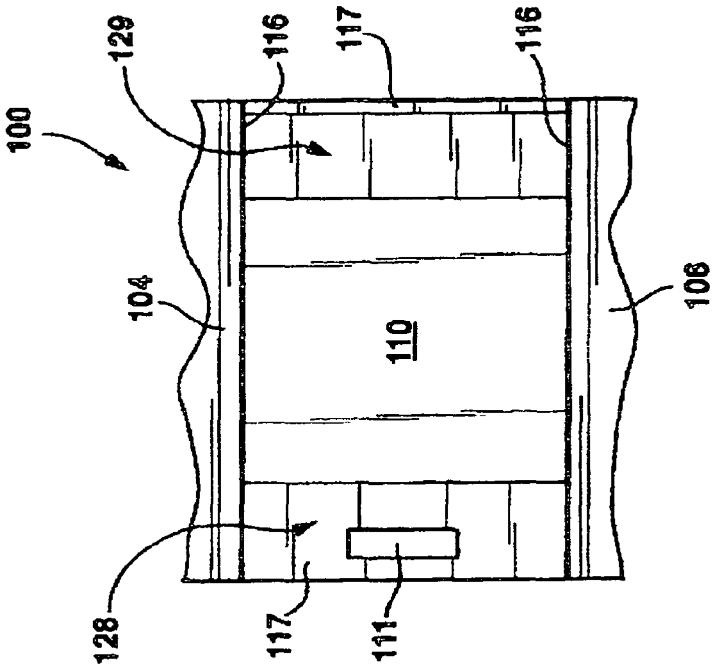
FIG. 20 is a cross-sectional top view of the air-debris separator of FIG. 17 at a particular location along the air-debris separator.
Figure 19:
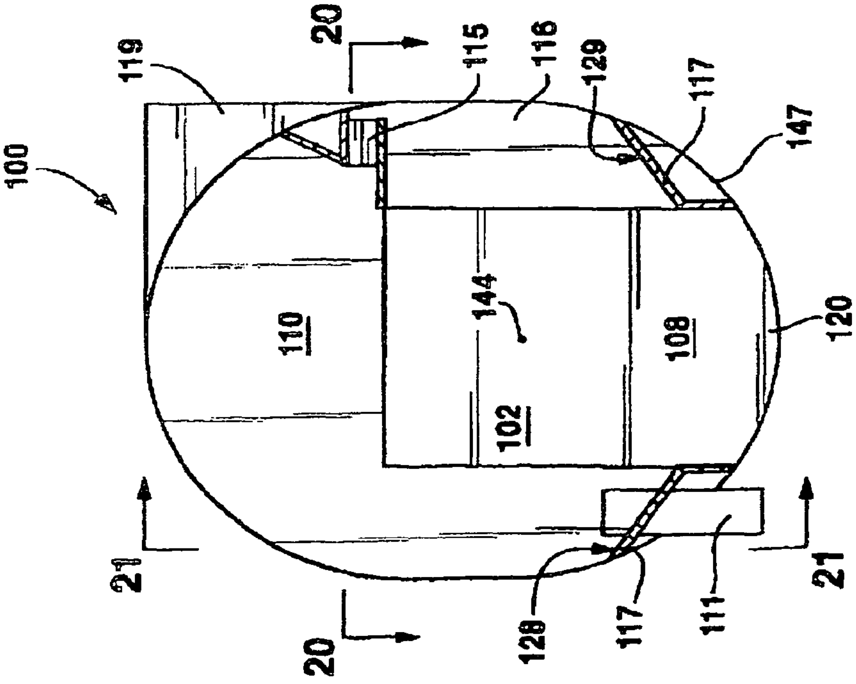
FIG. 19 is a cross-sectional end view of the air-debris separator of FIG. 17 at a different particular location along the air-debris separator than the view of FIG. 18.
Figure 21:
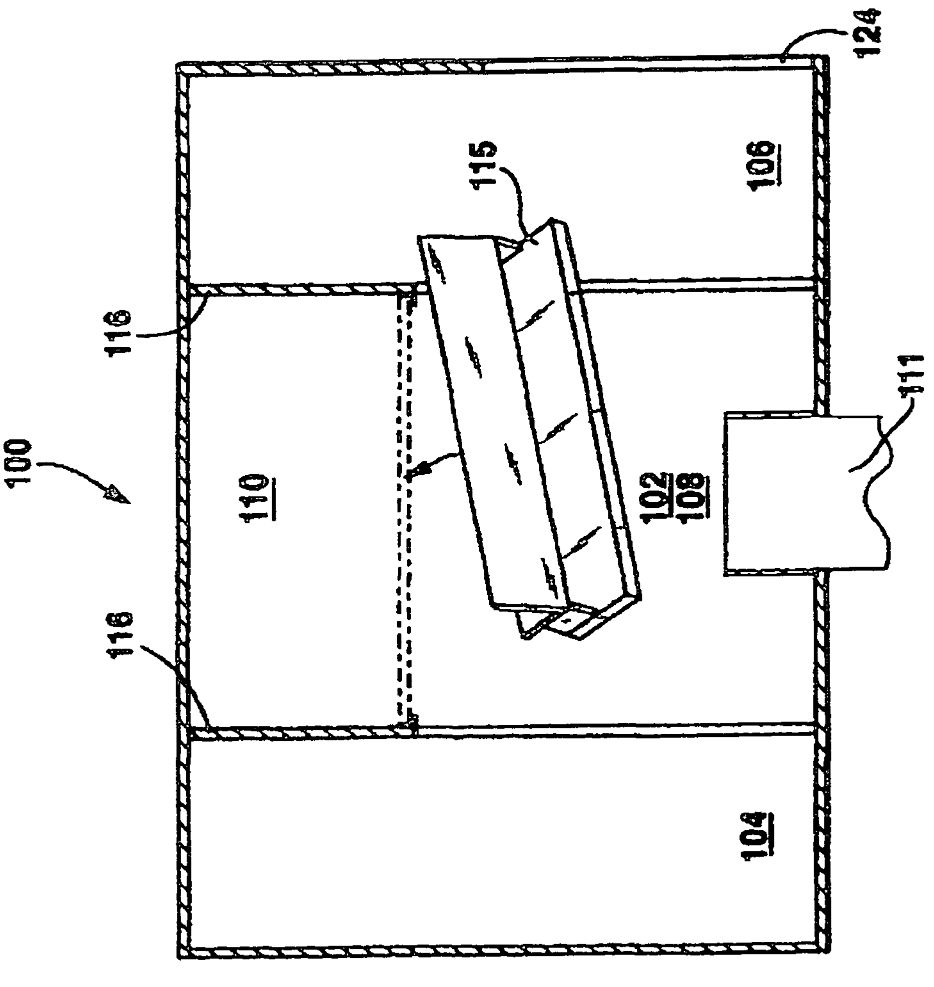
FIG. 21 is a cross-sectional side view of the air-debris separator of FIG. 17 at a particular location along the air-debris separator.
Figure 23:
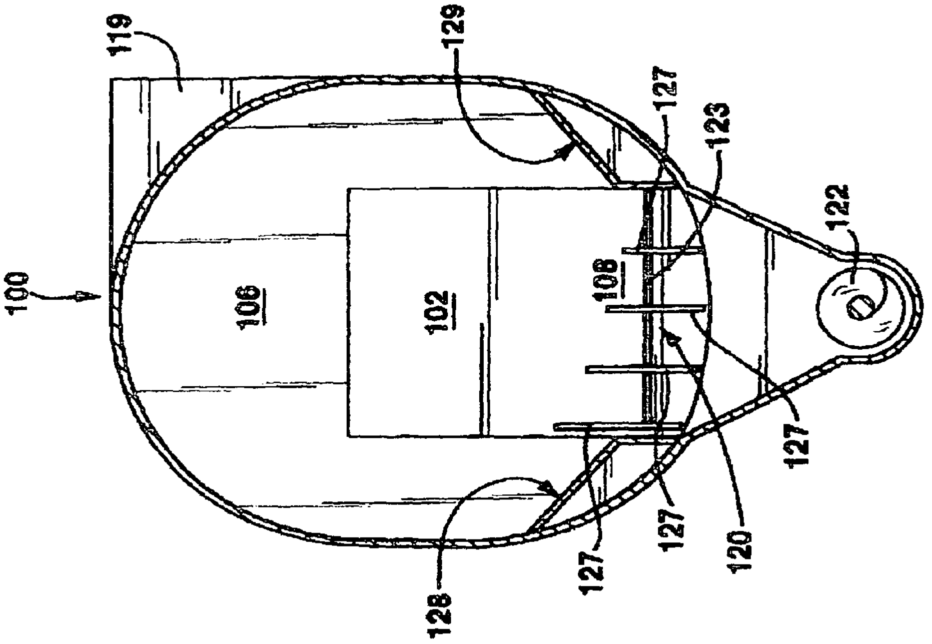
FIG. 23 is a cross-sectional end view of the air-debris separator of FIG. 17.
Figure 22:
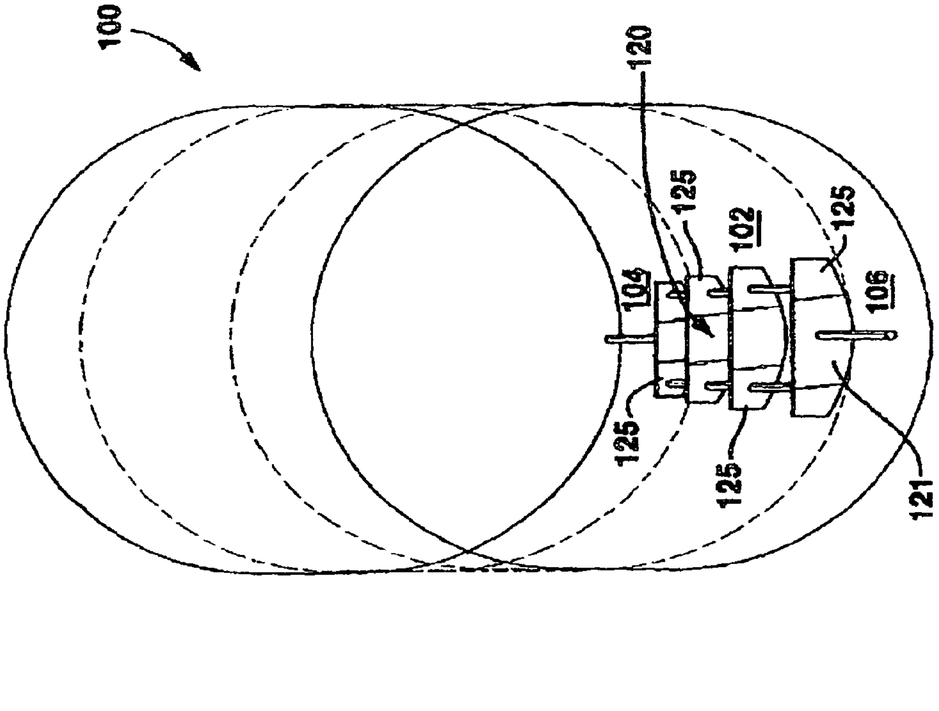
FIG. 22 is a phantom perspective view of the air-debris separator of FIG. 17 showing the dry debris gate of one embodiment of the invention.
Figure 24:
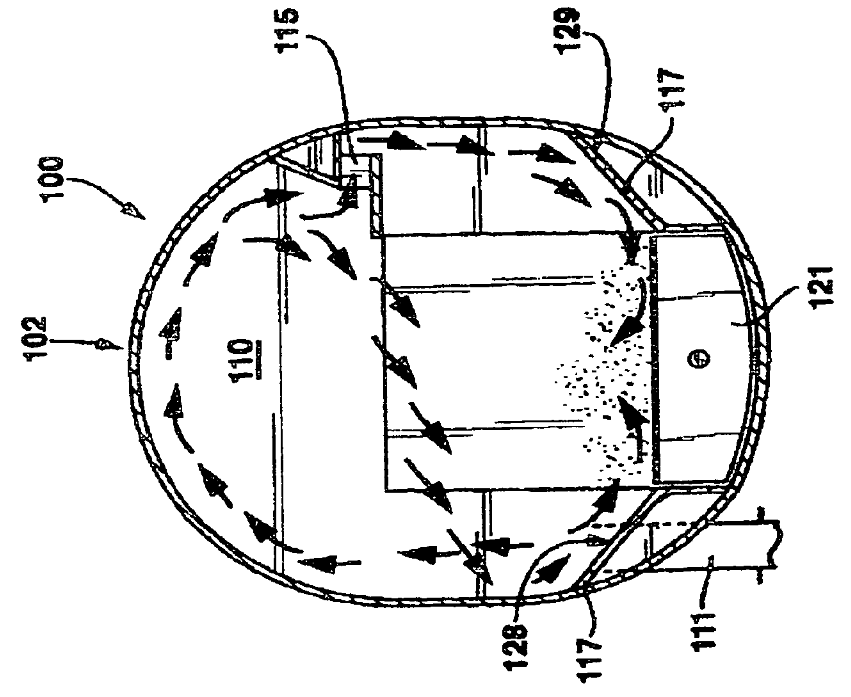
FIG. 24 is a cross-sectional end view of the air-debris separator of FIG. 17 at a particular location along the air-debris separator showing the flow of air and debris when the invention is in operation.
Figure 31:
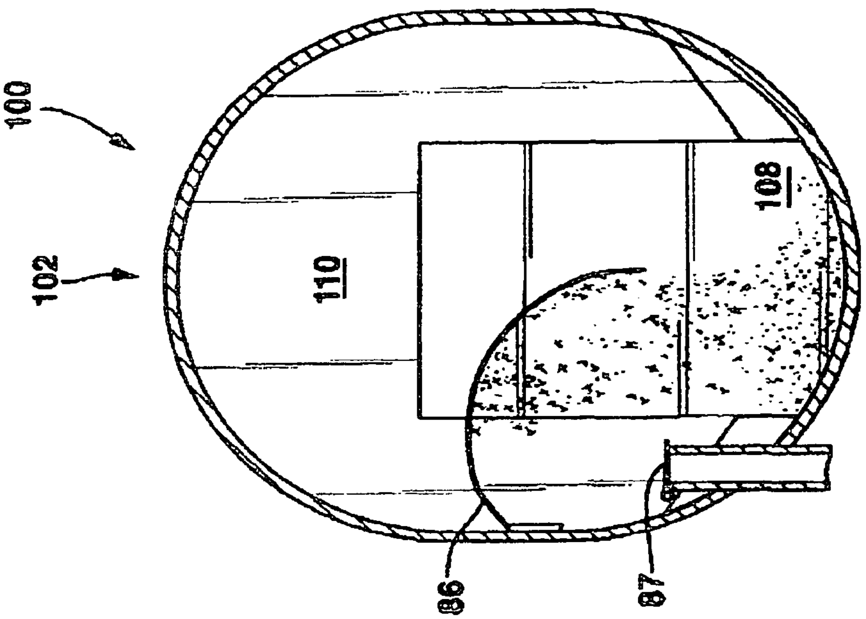
FIG. 31 is a cross-sectional end view of the air-debris separator of another embodiment of the invention at a particular location along the air-debris separator; and, FIG. 32 is a block diagram of the method of another embodiment of the present invention.
Figure 30:
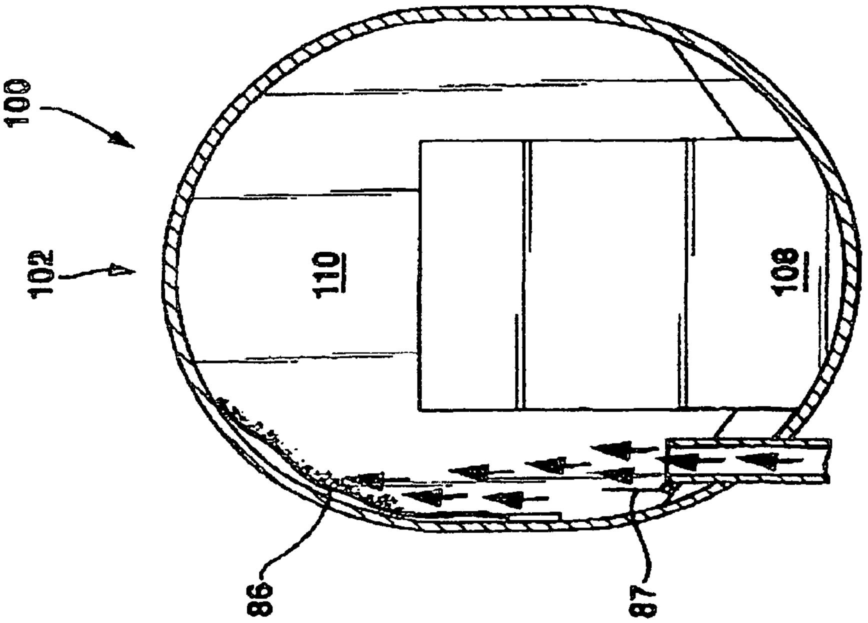
FIG. 30 is a cross-sectional end view of the air-debris separator of another embodiment of the invention at a particular location along the air-debris separator.

Air-debris separator cell 100 further comprises at least one bottom flow control baffle 117, as shown in FIGS. 19 and 20. A top flow control baffle 115 is located in cell middle section 102, as shown in FIGS. 19, 21 and 24. A dry debris grate 121 and a damp debris grate 123 both located in cell bottom portion 108, as shown in FIGS. 22 and 23. In the preferred embodiment, a flexible impaction shield 86 is located in the cell middle section 102, as shown in FIGS. 30 and 31.

Damp debris and dry debris have significant differences in their air handling characteristics; damp debris weighs more and readily settles out of an airstream but is prone to building up on the inner surfaces of air-debris separator cell 100 due to the direct high velocity impact of the debris containing airstream with the inner surfaces as previously discussed. Dry debris is more difficult to remove from an airstream because it is lighter, and once it does settle out by gravity action, it may re-enter the airstream unless shielded from the main airflow. Excessively damp or wet debris is not recommended for this application.

Figure 25:
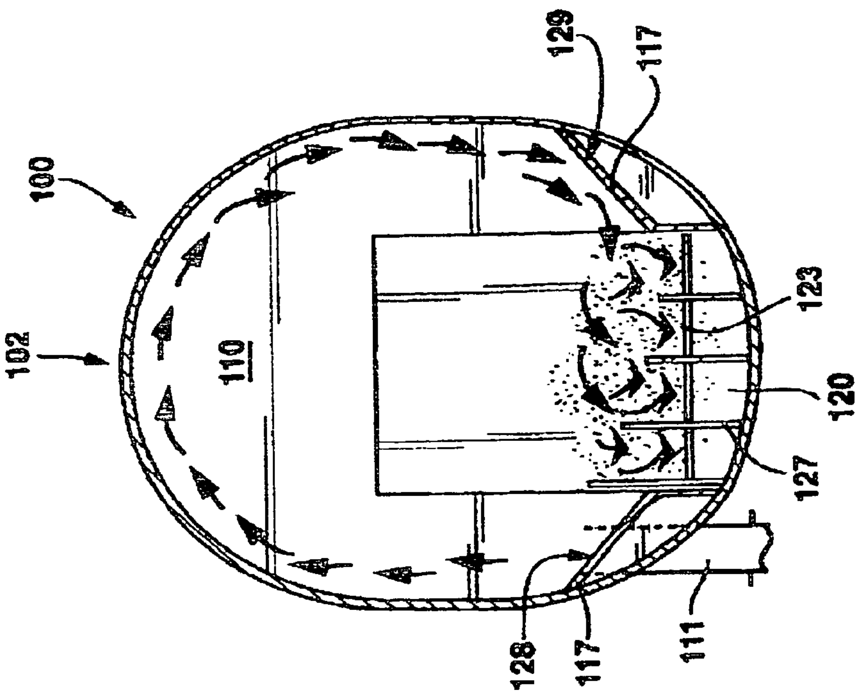
FIG. 25 is a cross-sectional end view of the air-debris separator of FIG. 17 at a particular location along the air-debris separator showing the flow of air and debris when the invention is in operation.
Figure 27:
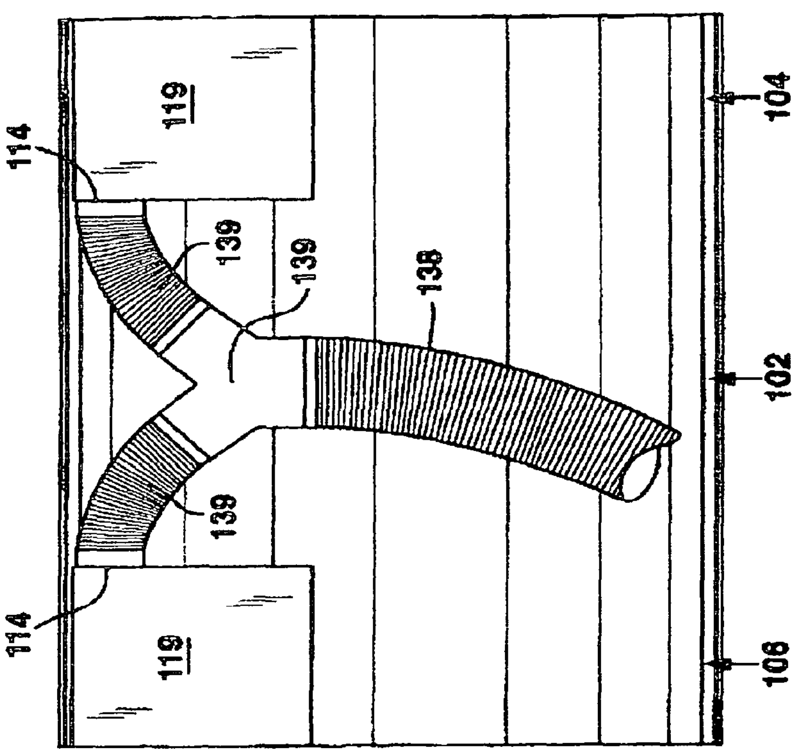
FIG. 27 is a side view of the air-debris separator of FIG. 17.

To achieve the best performance of the air-debris separator cell 100, the operator determines if the debris is damp or dry and sets up the apparatus accordingly. For dry debris this involves installing a top flow control baffle 115 (FIGS. 19 and 21) and a dry debris grate 121 (FIGS. 22 and 24). For damp debris only the damp debris grate 123 is used (FIGS. 23 and 25).

Bottom flow control baffles 117 are permanently positioned in cell middle section 102 above the cell collector 120 on opposite sides of the cell collector 120 to produce a first bottom flow control baffle 128 and a second bottom flow control baffle 129. The first bottom flow control baffle 128 is located on the side of the cell collector 120 nearest inlet 111 and directs the airstream impacting the first bottom flow control baffle 128 from above over the collector means 120 (FIGS. 19 and 24). The second bottom flow control baffle 129 is located on the side of the cell collector 120 farthest from the inlet 111 and directs the airstream impacting the second bottom flow control baffle 129 from above over the collector means 120 (FIGS. 19 and 24). As a result, air flow approaching either bottom flow control baffle 117 from above will be directed to flow approximately to and across the top of the cell collector 120 (FIGS. 19 and 24).

When the air-debris separator cell 100 is set up for damp debris, a damp debris grate 123 is positioned in or adjacently above the cell collector 120. The damp debris grate 123 consists of a series of parallel plates 127 parallel to the horizontal axis of the air-debris separator cell 100. Each plate 127 preferably increases in height moving from the inner wall opposite the cell inlet towards the cell inlet 111. The function of the damp debris grate 123 is to interact with and turn the airstream flowing across the top of collector means 120 to distribute more of the damp debris in end sections 104 and 106 of collector means 120 (FIG. 25).

When the air-debris separator cell 100 is set up for dry debris, a dry debris grate 121 is positioned in or adjacently above the cell collector 120. The dry debris grate consists of a series of parallel plates 125 placed along the horizontal axis of the air-debris separator cell 100, as can be seen in FIG. 22. As dry debris settles out of the airstream as described above, it will fall downward between the dry debris plates 125. The dry debris grate 121 minimizes interaction between the collected debris and the air, thereby preventing re-entrainment of the debris.

When the air-debris separator cell 100 is set up for dry debris, a top flow control baffle 115 is positioned in cell top portion 110 of cell middle section 102 opposite the inlet side and against the inner wall of the air-debris separator cell 100 (FIG. 21). The top flow control baffle 115 is by-directional in that the incoming airflow encounters top flow control baffle 115 and is directed or forced into taking two down stream flow paths that are approximately balanced.

One function of the top flow control baffle 115 is to direct a portion of the airstream impacting the top flow control baffle 115 toward and across the interior of the cell middle section 102 where it can contact the airstream entering the air-debris separator cell 100 through cell inlet 111 in a direction substantially opposed to or at substantially a right angle (FIG. 24). This contact between airstreams will cause the velocities of the airstreams to slow slightly thus reducing the ability of these airstreams to entrain the debris. As a result, some of the debris will fall to the cell collector 120. Some of the flow contacting cell inlet 111 will merge with cell inlet flow and recycle with little consequence.

The majority of the flow directed across the interior of cell middle section 102 by baffle 115 goes around inlet 111 and follows the inner contour of the cell middle section downward wherein it contacts the first bottom flow control baffle 128 from above which in turn directs the flow over the cell collector 120.

The other function of top flow control baffle 115 is to provide an airstream down the inner wall of the air-debris separator cell 100 in middle section 102 opposite the cell inlet 111 (FIG. 24). Likewise this flow strikes the second bottom flow control baffle 129 farthest from the inlet 111 from above and is directed over collector means 120. These opposing airflows (airflow directed over collector means 120 by striking the bottom flow control baffle 117 located nearest inlet 111 and airflow directed over collector means 120 by striking the bottom flow control baffle 117 located opposite the inlet 111) collide in the cell bottom portion 108 of cell middle section 102. This causes the velocity of each airstream to slow down at least momentarily and disperse before exiting cell middle section 102 enroute to end sections 104 and 106. This results in a substantial reduction of the ability of the airstream to entrain the debris, thus allowing the debris to fall to the cell collector 120.

Specific structures have been disclosed for top flow control baffle 115, vertical baffles 116, bottom flow control baffle 117, ducts and sections which have the function of directing one or more airstreams into configurations that cause the airstreams to lose velocity with the concomitant effect of causing the entrained debris to fall to the cell bottom portion 108 of the air-debris separator cell 100. However, it is understood that other arrangements and configurations of top flow control baffle 115, vertical baffles 116, bottom flow control baffle 117, ducts and sections could be used as will occur to those skilled in the art after evaluating the description of the invention contained herein that also cause the airstreams to lose velocity and, therefore, their ability to retain entrained debris. It is intended that these other arrangements and configurations fall within the scope of the invention.

As mentioned above, build-up of damp debris can occur on interior surfaces of the apparatus 10 at specific locations and develop to the point of interrupting airflow. This is problematic and directly related to the composition of the debris, moisture content, impaction force of the airflow and the angles of impaction involved. By flexing the base to which impacted debris bonds, the adhering debris will break up and either fall downward by gravity or be carried away in the airflow.

Flexible impaction shield 86 utilizes the aforementioned principle and is attached near, and above inlet 111 of the air-debris separator cell 100. The impaction shield 86 (FIGS. 30 and 31) is preferably made of a heavy duty flexible sheet material like mylar and has a reasonable duty life. When vacuum is applied, the airflow opens inlet cap 87 and positions the impaction shield 86 against the interior surface of the cell middle section 102 by contact between the airflow and the impaction shield 86. The impaction shield 86 covers the main impact area of cell inlet 111 flow and allows impaction to occur on its exposed surface facing the airflow. When vacuum is interrupted such as at rock bucket exchange interval when there is little or no airflow through the apparatus 10, the impaction shield 86 departs from the "up" position and falls away from the cell inner surface allowing the impaction shield 86 to flex on the way down (i.e, in the direction of the cell bottom portion 108 by the pull of gravity), and when airflow is resumed, it will flex again on the way up (i.e, in the direction of the cell top portion 110 by the push of the airstream). In both motions the impacted debris will break away from the impaction shield 86 and either fall to the cell collector 120 or be carried away in the airflow for later removal. Inlet cap 87 closes when airflow interrupted to prevent falling debris from entering the rock-debris separator 40.

A chamber flexible impaction shield 84 substantially similar to the impaction shield 86 described, may be placed in the rock-debris separator chamber 40, opposite and facing the chamber inlet 44 flow (FIGS. 3 and 4). The chamber flexible impaction shield 84 relies on the modulation of vacuum levels within the chamber 40 as occurs during normal operation. For example, when picking up rock and debris, the airflow necessary to pick up the rock and debris causes the vacuum level in the chamber 40 to increase. This increase allows more airflow to enter through auxiliary chamber air supply means 82 located behind flexible impaction shield 84, resulting in a flexing movement of the impaction shield 84 and corresponding dislodgement of debris, allowing debris to be carried out of the chamber 40 with the airflow.

Cell collector 120 preferably includes a trough or depression along the bottom of the air-debris separator cell 100. Several cell debris removal means 122 are possible such as manual removal of debris using a hand rake-like tool or an auger (FIGS. 8 and 23) through the cell access 124 (FIG. 8).

Vacuum means 130 preferably comprises a positive displacement vacuum pump 132 preceded by dust collector 136 or a centrifugal vacuum blower 132 followed by a dust collector 136 and powered by blower motor 134 (FIGS. 1, 2, 15 and 16). Ambient air is drawn through the apparatus 10 by vacuum means 130, while dust collector 136 removes dust and fine particulate matter that hasn't been captured previously, thereby minimizing the discharge of dust to the environment. Other types of dust collectors 136 may be used as will be clear to those skilled in the art, but the bag filter is the preferred method of collection for this application.

It is desirable to control the vacuum applied by vacuum means 130 to provide the necessary flexibility for handling a variety of materials and maximum productivity. For example, the vacuum may be controlled by varying the speed of the blower motor 134 or by regulating the airflow through adjustable air inlets such as chamber air supply means 80, adjustable air inlets 81 and auxiliary chamber air supply means 82 as shown.

In use, the apparatus 10 is moved into position where the head 22 can be near the rock that is to be cleaned. The cell debris removal means cell access 124 is closed so that adequate vacuum can be obtained in the apparatus 10. The vacuum means 130 is activated so that vacuum is generated throughout the device and particularly at intake 20 head 22. Head 22 is placed next to the rock that is to be cleaned whereby the vacuum causes the rock to enter and move through the hose 24 of the intake 20. Under this vacuum, an airstream is created whereby both rock and the associated debris on and around the rock will be brought to and through the intake 20. In all uses of the apparatus 10, if the rock bed is tightly compacted, it may be necessary to loosen the rock or debris by mechanical means such as a pick or shovel or by a rigid claw extending from the head 22.

Upon flowing through the intake 20, the rock and debris moves into the entry section 30 if used and rock-debris separator chamber 40 where the rock is separated from the debris and is collected in the collection container 72. The air, along with the debris moves to the air-debris separator cell 100 where the debris is captured in the air-debris separator cell 100, shown in FIGS. 1, 2, 9 and 10.

The preferred embodiment of the invention provides a method of vacuuming up and separating landscape rock or other solids from associated dirt and debris and thereafter collecting the cleaned rock and separating the debris from the discharge air. This method involves the use of an apparatus 10 having a rock-debris separator chamber 40 and an air-debris separator cell 100, as described above. With this apparatus 10, the user applies sufficient vacuum at the head 22 of intake 20 to cause rock and debris to be pulled into the hose 24, whereafter the airstream leaving hose 24 is directed into the rock-debris separator chamber 40, or, optionally, through the entry section 30 into the rock-debris separator 40. Inside the rock-debris separator chamber 40, the rock is separated from the air and debris as described above. Thereafter, this method includes directing the airstream leaving the rock-debris separator chamber 40 into the air-debris separator cell 100 through the cell inlet 111 or cell pre-exhaust inlet 112 and cell chamber exhaust inlet 113 where both are used. Inside the air-debris separator cell 100, the debris is separated from the air as described above and collected for reuse or disposal.

The preferred embodiment includes a method of cleaning rock. This method includes taking an airstream containing rock and slowing the velocity of the airstream down within the chamber to the point where the airstream can no longer entrain the rock whereupon the rock falls by gravity out of the airstream towards a chamber discharge outlet. This slowing of the velocity of the airstream is accomplished by expanding or increasing the cross-sectional area in which the airstream flows or by abruptly removing a portion of the airstream proximate the chamber inlet 44, or both, resulting in a reduction of the velocity of the airflow traversing through chamber 40.

In this method, debris picked up with the rock will typically be less dense than the rock. As a result, the airstream will continue to entrain most of the debris at a lower velocity than is required to entrain rock. Of course, some of the debris may fall with the rock towards the chamber discharge outlet 56. The chamber 40 has a chamber air supply means 80 that allows an airflow to be drawn vertically through the chamber discharge outlet 56. This vertical airflow in the chamber discharge outlet 56 is intense enough to entrain the debris but not intense enough to overcome the momentum of the falling rock. The balance of the airstream entering the chamber 40 through the chamber inlet 44 and the airstream entering the chamber 40 through the chamber air supply means 80 merge in the chamber 40 and carry debris out of the chamber 40 through the chamber exhaust outlet 52.

In addition, the invention also includes another method of cleaning rock in the airstream that picks up rock or debris or both at the intake head 22 of intake 20. This method is an independent method in itself but is preferably combined with the method of cleaning rock described above. This method includes vacuuming up landscape rock by whatever means and causing the rocks vacuumed up to collide with each other and the sides of the vacuum hose 24 in a turbulent airflow to dislodge dirt and debris from the rocks. As a result, the rocks have been cleaned in that a portion of the dirt or debris has been separated from the rocks.

The air-debris separator cell 100 includes a method of separating air from debris, including any rock that may be present. This method includes directing the airstream into configurations that disperse the airstream, split the airstream into smaller segments, impede the airstream or a combination thereof, to slow the velocity of the airstream down to the point that the airstream is unable to entrain the debris. The debris and any rock present fall under the influence of gravity to the cell collector 120.

This method of directing an airstream commences as the airstream containing debris is directed vertically into the air-debris separator cell 100 through cell inlet 111 located on the bottom portion 108 of the air-debris separator cell 100. The airstream disperses as it leaves the confines of cell inlet 111 and enters the relatively large area of the cell middle section 102. The flow continues to disperse as it follows the inner contour of the cell middle section 102 located between the two vertical baffles 116, rising initially then, through contact with the cell top portion 110, turning downwards towards the cell bottom portion 108. As the flow passes the confines of vertical baffles 116, the airstream increasingly splits and is drawn toward the cell exhaust plenums 119 located in the cell top portion 110 of the first end section 104 and second end section 106. As stated above, the cell exhaust plenums 119 preferably have a horizontal array of inlets 145 that further segments and disperses the vertical airflow approaching the cell exhaust plenum 119 in each respective first end section 104 and second end section 106.

In addition to the method described above, a top flow control baffle 115 is preferably utilized when the use of the apparatus 10 involves dry debris. This top flow control baffle 115 is used to improve the operational efficiency of the apparatus 10 with dry debris. This method also includes a method of directing an airstream wherein the initial downward flow of the airstream in the cell middle section 102, as indicated above, is further directed by the top flow control baffle 115 into at least one additional downward flow path. Both downward flow paths are then directed to contact the bottom flow control baffles 117 from above where the bottom flow control baffles 117 direct the downward flow across the cell collector 120. Both bottom flow control baffles 117 direct the airflows contacting them across the cell collector 120 resulting in substantially head-on contact from opposing airflows that occurs over the top of the cell collector 120. These opposing airflows impede air movement, at least momentarily slowing the velocity of the airstream down and providing another opportunity for the suspended debris to fall from the airstream into the cell collector 120.

A preferred embodiment of the invention also includes a method of preventing the build up of impacted debris on selected interior surfaces of the apparatus 10. This is accomplished by use of flexible impaction shields 84 and 86. Each flexible impaction shield 84 and 86, consisting of a sheet like material as described above, is suspended over a site prone to impaction by debris. When such impaction occurs, it will form on the side of the shield 84 or 86 facing the airflow that produces the impaction. As routine changes to the airflow occur, the flexible impaction shield 84 and 86 will flex, bend and flap, therein dislodging the impacted debris from the shields 84 and 86 into the airstream.

Figure 15:
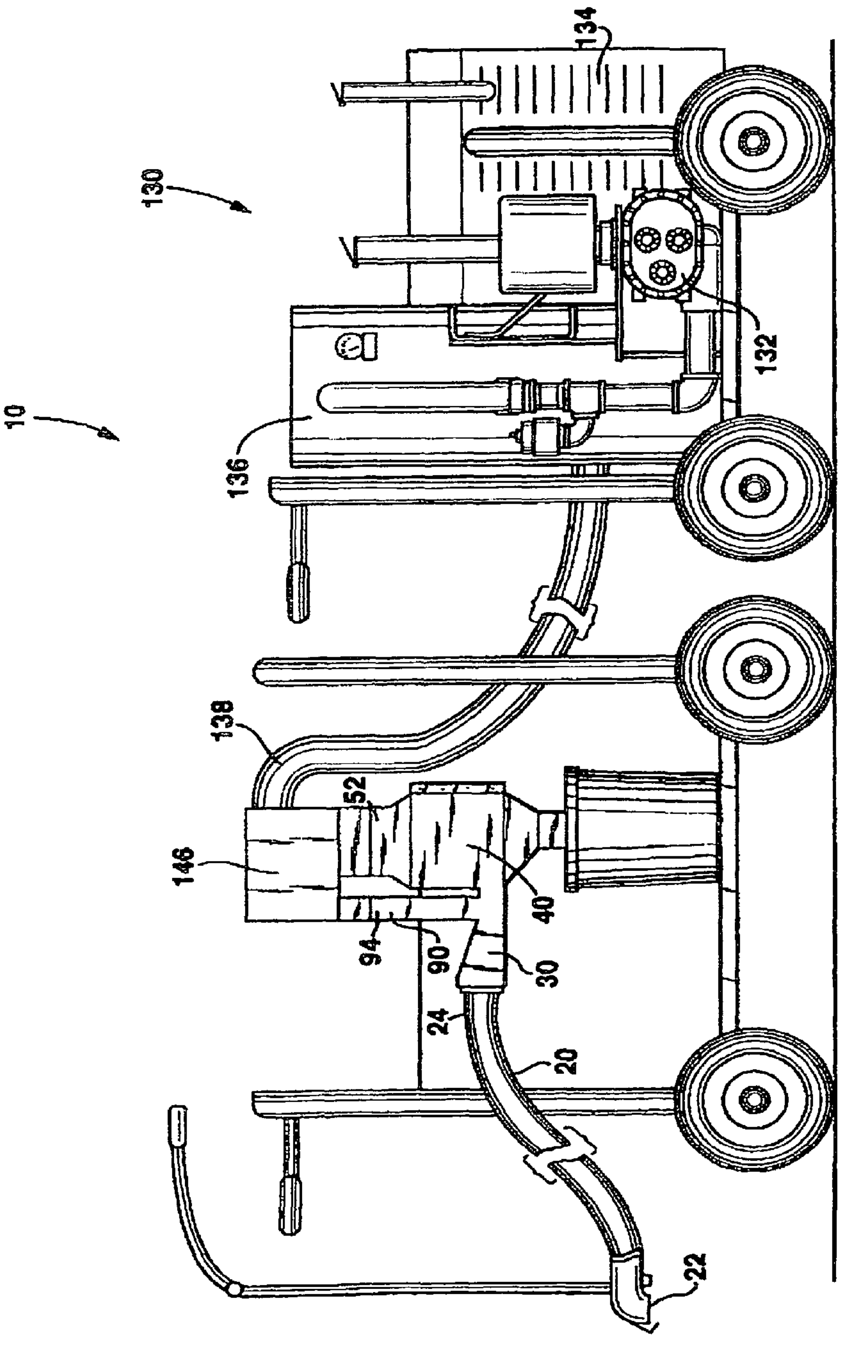
FIG. 15 is side view of another embodiment of the invention.

Although the preferred embodiment of apparatus 10 includes both a rock-debris separator chamber 40 and an air-debris separator cell 100, in another embodiment of the invention shown in FIG. 15, the apparatus 10 does not include the air-debris separator cell 100. In this method of operation, the pre-exhaust outlet 94 and the chamber exhaust outlet 52 are connected to the vacuum means 130 directly through the rock-debris separator vacuum manifold 146 and vacuum conduit 138 so that there is no air-debris separator cell 100. In all other respects, the apparatus 10, including chamber 40, is as described above.

In the former embodiment, an apparatus 10 is provided having a rock-debris separator chamber 40 as described above. With this apparatus 10, the user applies sufficient vacuum at head 22 of intake 20 to cause rock to be pulled into the hose 24 in an airstream containing air, rock and debris whereafter the airstream is directed into the rock-debris separator chamber 40 through the chamber inlet 44 or the entry section 30 if used and then through the chamber inlet 44. Inside the rock-debris separator chamber 40, the rock is separated from the air and debris as described above. Because this embodiment does not separate debris from the air prior to vacuum means 130, the invention is preferentially intended to pick up and clean rock containing only a small quantity of dry debris.

Figure 16:
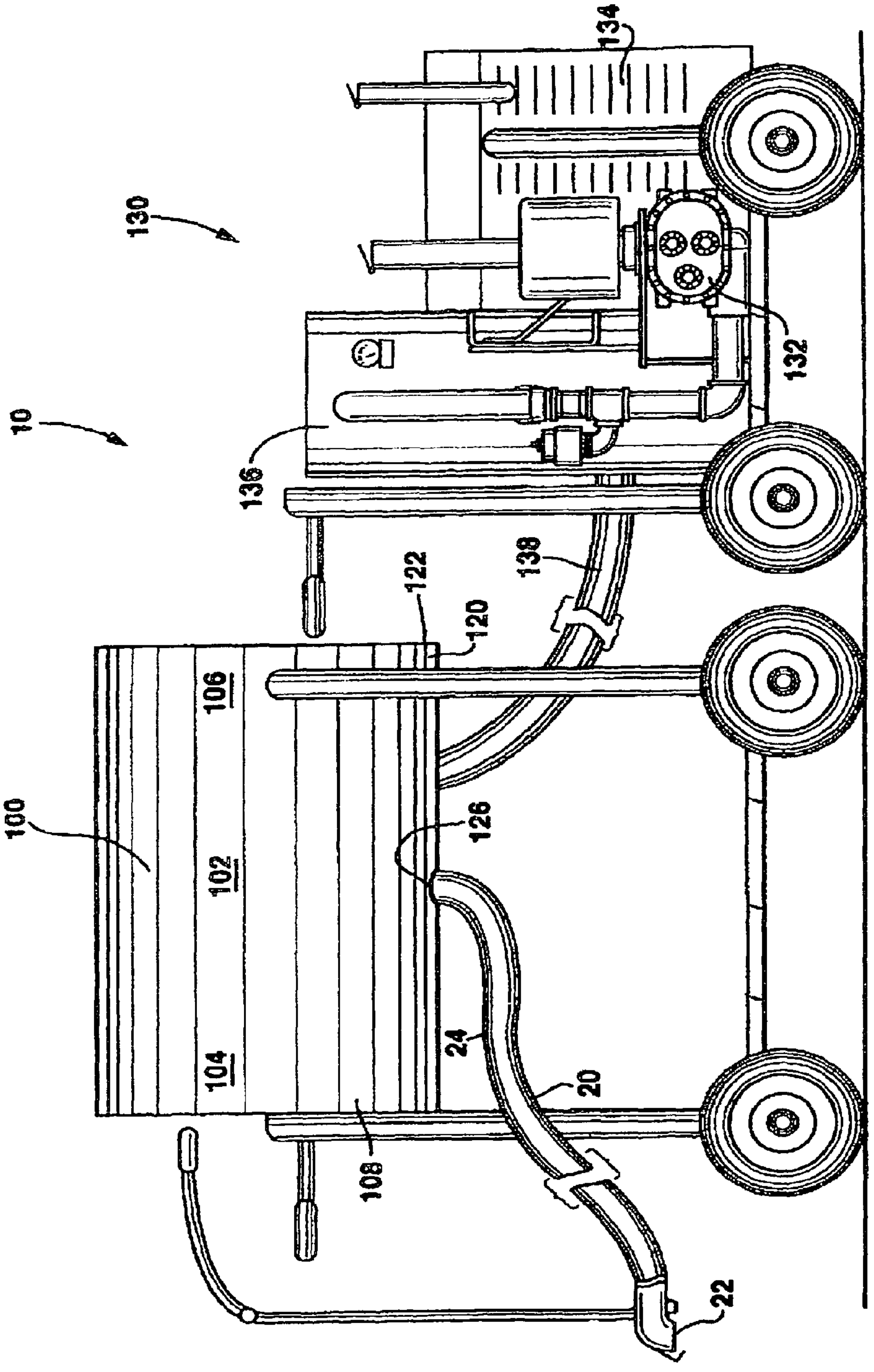
FIG. 16 is a side view of another embodiment of the invention.
Figure 17:
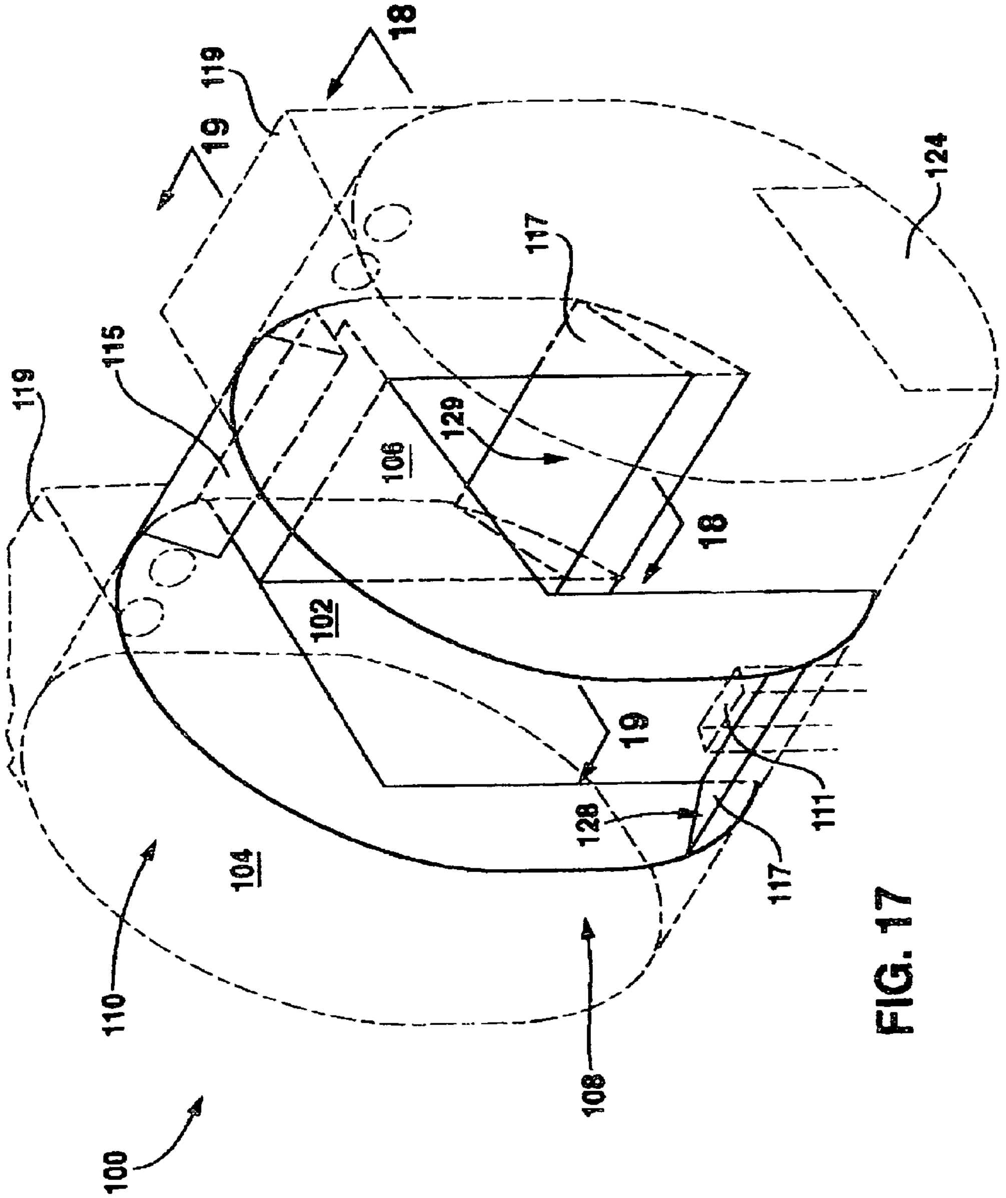
FIG. 17 is a phantom perspective view of the air-debris separator of one embodiment of the invention.
Figure 18:
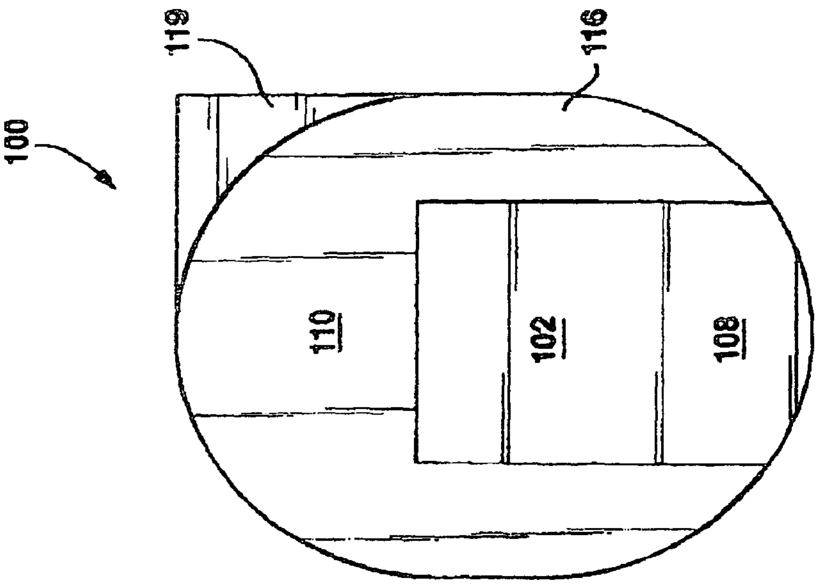
FIG. 18 is a cross-sectional end view of the air-debris separator of FIG. 17 at a particular location along the air-debris separator.

In yet another embodiment of the invention shown in FIG. 16, the apparatus 10 does not include the rock-debris separator chamber 40. In this method of operation, the intake 20 is connected directly to the air-debris separator cell 100 at cell inlet 126. Air-debris separator cell 100 in this embodiment is substantially as described above except that cell inlet 126 replaces the single cell inlet 111 or the cell pre-exhaust inlet 112 and chamber exhaust inlet 113. In this method of operation, both rock and debris are separated from the airstream flowing through the air-debris separator cell 100 and collected for reuse or disposal. As in the aforementioned methods, the user applies sufficient vacuum at the head 22 of intake 20 to cause debris to be pulled into the hose 24, from which it flows directly into the air-debris cell 100 when the rock-debris separator 40 is not used. Of course, where rock is present with debris, the apparatus 10 will pick up the rock with the debris. In this embodiment, the apparatus 10 does not separately remove rock and debris from the airstream picked up at head 22. Instead, this embodiment removes debris and any rock picked up in the airstream as described above. Because this embodiment does not separate any rock from debris, this embodiment of the invention is preferentially intended to be used to collect debris including moist or damp debris and minimal rock.

Figure 32:
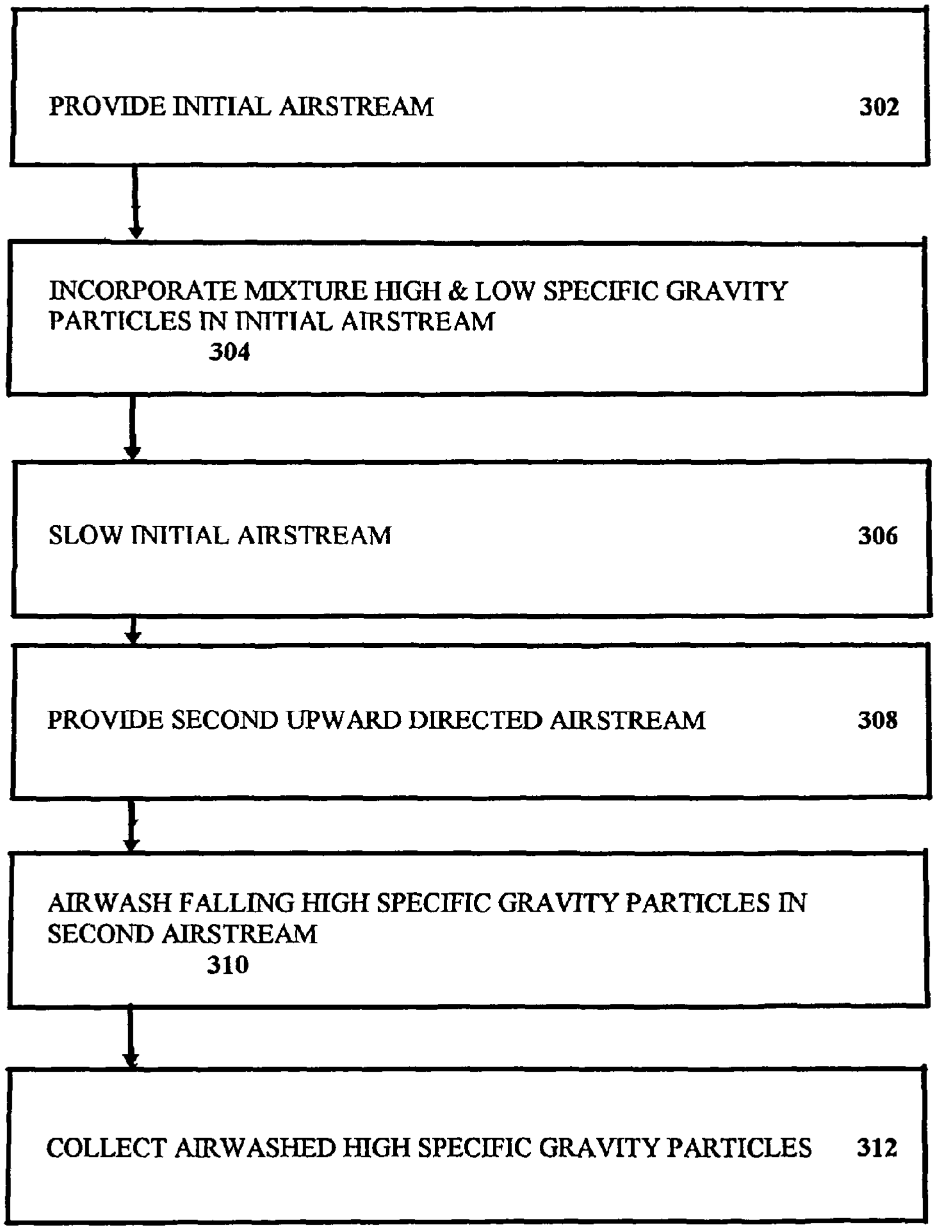

The present invention has been described in connection with certain embodiments. It is to be understood, however, that the description given herein has been given for the purpose of explaining and illustrating the invention and are not intended to limit the scope of the invention. For example, specific examples of the means for creating vacuum pressure have been shown. However, it is clear that an almost infinite number of ways of producing sufficient vacuum could be used as is well understood by those skilled in the art. Consequently, it is intended that all such sources of vacuum are included in the present invention. It is to be further understood that changes and modifications to the descriptions given herein will occur to those skilled in the art. Therefore, the scope of the invention should be limited only by the scope of the following claims and their legal equivalents. For the purposes of these embodiments the following terms are defined to have the following meanings unless otherwise provided, described or indicated by the context. Debris is defined as a mixture of one or more of the following: soil, inorganic materials such as silt, or sand and organic materials such as decomposing or decomposed leaves, grass clippings, plant clippings, seeds, sticks and weeds, all accompanied by varying amounts of moisture. Landscape rock or rock is defined as any naturally occurring rock or stone, both as is or crushed, or similar man-made solid materials used as a landscape material, having a specific gravity of at least 1.25, and with the linear dimension of the particles ranging from about 0.5 inches to about 3.5 inches. Solids are defined as any solid materials, including rock used for other purposes, both naturally occurring and man-made, which have a variety of end uses requiring cleaning or separation, with a specific gravity of at least 1.25. Airflow or airstream are used interchangeably and are defined as a flow of air resulting from the application of vacuum which airflow or airstream may contain entrained rock, dirt or debris. Throughout this description, an element referred to by a reference number has the characteristics and attributes described in association with that element wherever such element is referred to unless specifically directed otherwise. As depicted in the block diagram of FIG. 32, in another embodiment 300, the present invention is a method of separation of mixtures of populations of high specific gravity particles and low specific gravity particles into two segregated populations of granules. In the method of this embodiment, the two segregated populations of granules are each characterized by a dissimilar range of specific gravity. These two populations may be understood as defining, first, a high specific gravity range granular material and defining, second, a low specific gravity range granular material. The method for separating the two populations includes the steps of:

providing an initial airstream 302; incorporating the mixed granular material into the initial airstream 304; slowing the initial airstream to allow the high specific gravity material to fall 306; providing a second airstream with an upward direction 308 and directing the second airstream against the falling high specific gravity material to air-wash the falling high specific gravity material 310; and collecting the air-washed high specific gravity material 312. The low specific gravity material may be collected subsequently, thereby separating the two populations. The method is applicable to mixtures of spent firearms projectiles and backstop material, such as for example, mixtures of lead bullets (high specific gravity population) and rubber pellets (low specific population) or mixtures of lead bullets (high specific gravity population) and sand (low specific gravity population) or mixtures of lead shot (high specific gravity population) and dirt (low specific gravity population), all of which might be encountered in recovering lead from firing ranges. It is the environmental cleanup and economic recovery of lead of lead from such sources that is a particular focus of this aspect of the present invention. Sources of such spent lead, which has a high specific gravity, might be shotgun pellets or shot with sizes ranging from buckshot to #9 shot, most preferably from #4 to #9 shot, such as encountered at skeet ranges, trap ranges and similar ranges, pistol rounds, whether jacketed or cast lead, rifle rounds, whether jacketed or cast, airgun pellets, and like pellets, all of which are distinct from backstop materials into or onto which they might be deposited in shooting sports, including, dirt, sand, wood chips, rubber chips or pellets, grass clippings, glass or glass fragments, broken clay targets, etc. Preferably, the mixture has been screened or otherwise limited in particle size. That is, the method effectiveness suffers when excessively large particles are present in the mixture, for example large rocks in mixtures with dirt and spent lead may degrade the effectiveness of the separation, either by plugging passages or by large rocks behaving differently than the smaller particle sized dirt population in airstreams or requiring excessively high velocity airstreams to incorporate the mixture into the airsteam. Preferably, a screening of the mixture, prior to the separation method, might be to pass a screen of about ⅜ inch or smaller size, prior to incorporation into the initial airstream. Screening, for example, can limit such problematic size distribution degradation by removing large rocks from the lead and dirt mixture prior to incorporation into the initial airstream. Incorporation of the mixture into the initial airstream can be by vacuuming through a hose or mechanically dispensing the mixture into the airstream, for example, by dropping screened mixtures into a suitable initial airstream or by elevating the mixture into an airstream or by horizontally advancing the mixture into an airstream. The step of slowing the initial airstream bearing the suspended mixed granular materials to a second velocity, slower than the first velocity, preferably includes a step of providing a pre-exhaust, such as earlier described with respect to cleaning landscape rock. Preferably, the provided pre-exhaust abruptly removes a portion of the initial airstream prior to a directional change of the airstream to approximately vertical and upwardly directed. Preferably, the slowed initial airstream turns approximately vertical and upwardly in direction. Preferably, momentum of the suspended mixed granular material along with the slowed initial airstream carries the mixed granular material forward as the slowed initial airstream turns approximately vertical. More preferably, with respect to the initial air stream slowing, the percentage of air removed by the provided pre-exhaust from the initial airstream is from about 35% to about 50% of the volume of the initial airstream. Preferably, the initial airstream is confined within a first cross-sectional area and further wherein the step of slowing the initial airstream bearing the suspended mixed granular materials to a second velocity, slower than the first velocity, includes a step of expanding the confining cross-sectional area to a second cross-sectional area, greater than the first cross-sectional area. Preferably, combining the second airstream with the slowed initial airstream, results in any removed low specific gravity range granular material air-washed from the falling high specific gravity range material rejoining the slowed, initial airstream and the main portion of the population of the low specific gravity range granular material suspended therein. Preferably, the low specific gravity range granular material is subsequently removed from the slowed initial airstream by further slowing the slowed initial airstream to a third velocity, the third velocity slower than the second velocity, such that the low specific gravity range granular material falls from the third velocity airstream. The low specific gravity range granular material falling from the third velocity airstream is then collected. As noted earlier, preferably, the mixed granular material to be separated is pre-screened to a predetermined range of size. Preferably, the mixed granular material to be separated is pre-dried to predetermined moisture content. The collected high density material will be substantially spent firearms projectiles or range lead. This is improved in economic value, in part, because of the air washing it has received, which renders it more valuable for refining and recovery. In another embodiment, the present invention is a method for separating a mixed granular material into two segregated populations of granules, the two segregated populations of granules each characterized by a dissimilar range of specific gravity and defining a high specific gravity range granular material and a low specific gravity range granular material. The method for separating includes the steps of: providing an initial airstream, the initial airstream having a first velocity capable of suspending the mixed granular material; incorporating the mixed granular material into the initial airstream to suspend and transport the mixed granular material; slowing the initial airstream bearing the suspended mixed granular materials to a second velocity, slower than the first velocity, such that the high specific gravity range granular material falls from the slowed, initial airstream and the low specific gravity range granular material remains suspended in the slowed, initial airstream; providing a second airstream, the second airstream upwardly directed and arranged to have a counter-current relationship to the falling high specific gravity range granular material, the second airstream having a velocity insufficient to entrain the falling high specific gravity range granular material but sufficient to entrain any low specific gravity range granular material; subjecting the falling high specific gravity range granular material to the second airstream, so as to air-wash the falling high specific gravity granular material and remove any low specific gravity range granular material accompanying the falling high specific gravity range granular material; and collecting the air-washed high specific gravity range granular material falling from the second airstream. Preferably, the step of incorporating the mixed granular material into the initial airstream, includes vacuuming up the mixed granular material into the initial airstream or mechanically dispensing the mixed granular material into the initial airstream. Preferably, the step of slowing the initial airstream bearing the suspended mixed granular materials to a second velocity, slower than the first velocity, includes providing a pre-exhaust, the provided pre-exhaust abruptly removing a portion of the initial airstream prior to an upwardly directed directional change of the airstream to approximately vertical and wherein the slowed initial airstream turns approximately vertical and wherein momentum of the suspended mixed granular material along with the slowed initial airstream carries the mixed granular material forward as the slowed initial airstream turns approximately vertical. Preferably, the slowing results from a percentage of the air removed by the provided pre-exhaust from the initial airstream in the range of from about 35% to about 50% of the volume of the initial airstream. Preferably, the initial airstream is confined within a first cross-sectional area and the step of slowing the initial airstream bearing the suspended mixed granular materials to a second velocity, slower than the first velocity, includes expanding the confining cross-sectional area to a second cross-sectional area, greater than the first cross-sectional area. Preferably, the second airstream, including any removed low specific gravity range granular material air-washed from the falling high specific gravity range material combines with the slowed, initial airstream including the suspended low specific gravity range granular material. Preferably, the low specific gravity range granular material is removed from the slowed initial airstream by further slowing the slowed initial airstream to a third velocity, the third velocity slower than the second velocity, such that the low specific gravity granular material falls from the third velocity airstream. The low specific gravity range granular material falling from the third velocity airstream is then collected. As explained previously, preferably, the mixed granular material to be specific gravity separated is pre-screened to a predetermined range of size. Preferably, the mixed granular material to be specific gravity separated has a pre-determined moisture content. This moisture content may be achieved by pre-drying. Alternatively, some moisture may be removed by incorporation into the initial airstream. Excessive moisture interferes with the incorporation into the initial airstream. Preferably, the high specific gravity range granular material may consist of various types of higher density components and the low specific gravity range material may consist of various types of lower density components. Preferably, the high specific gravity range granular material originates in a firearm projectile and the low specific gravity range material originates in a firing range backstop material. More preferably, the high specific gravity range granular material includes metallic lead and the low specific gravity range material originates in a firing range backstop material. In yet another application and embodiment of the present invention, a process and apparatus for picking up and cleaning ballast rock, especially fouled ballast rock, such as the fouled ballast rock found in railroads which are in need of track maintenance activities. Ballast rock serves a number of purposes but most importantly provides a bed which stabilizes railroad ties supporting parallel rails. Ballast also serves to keep ties, typically made of wood, relatively thy by allowing rain to drain away, thereby encouraging longer service life. Much like ornamental landscape rock, ballast tends, over time, to become loaded with smaller particles, sand and dirt. This condition is known as "fouling" of the ballast. The present invention allows fouled ballast to be picked up, by vacuuming and cleaned, thereby making it available for reuse. The ballast cleaning and pickup process is applicable to ballast rock (as earlier defined as any naturally occurring rock or stone, both as is or crushed, typically having a specific gravity of at least 1.25 but with the linear dimension of the particles ranging from about 3 inches to about 9 inches. While sizing of the intake, chamber 40 and other components must be increased appropriately to the ballast size, the general operation of the process and apparatus is as earlier explained with respect to landscape rock. One of ordinary skill will be able to appropriately size the components and employ appropriate strength and thickness materials to withstand the impact and wear of ballast rock as well to provide vacuum/airstream appropriate to the more substantial ballast rock. One notable advantage is that the ballast rock may be removed from the rail bed in either the presence or absence of rails and ties with minimal additional effort as the vacuuming progressively removes and picks up the ballast rock. Collisions of the ballast rock with other balls rock and the walls and sides of the intake facilitates cleaning by removing dirt and debris from the ballast rock.

In yet another application and embodiment of the present invention, a process and apparatus for enriching precious metal ore, such as gold bearing ore is disclosed. By way of summary, a process for dry enrichment of a precious metal ore is disclosed. The preferred precious metal is gold, however, the process may be used for platinum or palladium or silver or other precious metal ores. The precious metal ore should be understood as having a particle size distribution with an upper size limit and having fines below the upper size limit, the precious metal ore including rock and a precious metal having a density greater than the rock. The process includes the step of, first, providing an airstream for entraining the precious metal ore, the airstream having an entrainment velocity. Next, the ore is entrained and conveyed as the precious metal ore to a container using the airsteam at the entrainment velocity. Next, the velocity of the airstream is reduced to a lower velocity, the lower velocity being insufficient to entrain at least the upper size limit particles of the particle size distribution of the precious metal ore, such that at least the upper size limit particles exit the airstream, while at least some of the fines remain entrained in the lower velocity airstream. Then, the upper size limit particles exiting the airstream are collected. The process is a dry enrichment of precious metal ore in the collected particles exiting the reduced velocity airstream results from the process or alternatively the process is a dry enrichment of precious metal ore in the particles remaining entrained in the reduced velocity airstream results from the process. Preferably, the precious metal ore is screened to provide the upper size limit prior to entraining in the airstream. In a more advanced embodiment, the process step of reducing velocity of the airstream at a second reduced velocity, the second reduced velocity being lower than the reduced velocity previously employed, wherein a dry enrichment of precious metal ore in the particles remaining entrained in the reduced velocity airstream results from the reduced velocity and the second reduced velocity results in dry enriched ore exiting the airstream and then collecting the particles exiting the second reduced velocity airstream. In such a more advanced embodiment of the process, the second velocity reduction further enriches the precious metal ore by retaining entrained fines with a lower content of precious metal than particles exiting the second reduced velocity airstream for collection. One preferred subprocess which may occur and render the process particularly useful in enriching ore is that the step of entraining and conveying results in collisions of precious metal bearing particles within the particle size distribution such that the particle size distribution is shifted to smaller particles and enriched precious metal bearing particles are generated within the precious metal ore. This might be best understood as similar to dirt being cleaned from rock due to collisions with other rock or walls or sides of the intake, as previously disclosed with respect to landscape rock cleaning. That is, the ore particle collisions include collisions with the entraining airstream boundary (such as, for example, walls or sides of a structure containing and directing the entraining airstream.) Additionally or alternatively, the collisions include collisions between particles being conveyed by the entraining airstream. In either situation, collisions of particles can be effective to enrich, separate, and/or segregate the most economically significant portion of the precious metal ore. That is particles, such as flakes, specs, dust, and small nuggets may be broken free from rock particles within the ore. The separation capabilities of the process, to some extent, are based upon differences in density of the precious metal relative to rock as the particles relatively enriched in precious metal, having higher density, will more easily fall from the reduced or second reduced velocity airstream. Additionally, precious metals such as gold are characterized by substantial malleability (relative to rock) and thus shapes which are less prone to falling from the airstream may be encountered and thus separated and collected after the second reduction in velocity. Those skilled in the art will recognize that the characteristics of various precious metal ores vary widely and thus significant testing may be warranted for any particular ore, in order to determine which level of reduction of velocity more effectively results in enrichment. Using substantial cautions and safety measures, the process may be modeled and or tested by employing a pre-screened rock sample and adding a portion of dense metal particles, such as for example lead shot of different sizes, and observing which velocity reduction(s) provide the optimum recovery of different lead shot sizes. However, it should be recognized that lead is toxic and airborne lead dust might be generated are represent a hazard so appropriate dust handling is essential while performing such modeling or testing. The rock-debris separator chamber 40 previously described for rock cleaning and recovery is a starting point for precious metal ore enrichment, however, velocities and reductions must be adjusted commensurate with the ore and precious metal of interest. The lead shot modeling, described above, contributes to determining more appropriate adjustments. Ultimately, optimal adjustments must be made with the specific precious metal ore to be processed. One of ordinary skill will recognize that the enriched ore may be further processed to extract the precious metal or a still more enriched ore for subsequent extraction by known processes in the precious metal field. It should be further explained that two chambers, such as rock-debris separation chamber 40, may be sequentially arranged with the second chamber receiving a reduced velocity airstream from the first chamber. In a preferred embodiment, at least one chamber 40 is employed and more preferably, multiple chambers are sequentially employed to provide precious metal ore dry enrichment. Another aspect of this invention is that precious metal ores taken direct from the earth, such as placer samples, as often found in low flow or nearly dry creek beds or dry creek beds, may still include significant moisture on the particles or have particles relatively loosely associated with each other due to residual moisture. The dry process of the present invention tends to advantageously dry or at least reduce the moisture of such samples. This drying effect, in turn, facilitates separation of moisture joined particles into separate particles, thus allowing better air separation or segregation of the most desirable particles, those composed of either entirely or substantially the denser precious metal being collected in the process. The precious metal ore enrichment process is applicable to placer type ores (characterized by being mainly relatively rounded or smooth and pebble-like, such as resulting from creeks or streams), or rock (as earlier defined as any naturally occurring rock or stone, both as is or crushed, typically having a specific gravity of at least 1.25) but with the linear dimension of the particles ranging down to about 0.1 inches.

What is claimed is:

1. A process for picking up and cleaning ballast rock comprising the steps of:

providing an apparatus for picking up and cleaning ballast rock comprising:

an intake having a head at one end and an outlet at the other end;

a chamber having a bottom, an inside and an outside and a chamber inlet fluidly connected to the outlet end of the intake and disposed to receive an airstream from the intake and to direct at least a portion of the airstream from the intake into the chamber, the airstream capable of entraining rock and debris within the airstream, the chamber having a chamber exhaust outlet for discharging air and debris from the chamber, the chamber having a chamber discharge outlet located on the bottom of the chamber for discharging ballast rocks falling by gravity through and from the chamber;

a vacuum source for producing vacuum, the vacuum source fluidly connected to the chamber, whereby the airstream is drawn into the chamber by vacuum applied through the intake to the head end of the intake; whereby ballast rock and debris is vacuumed into the intake at the head end of the intake forming an airstream with entrained ballast rock and debris and wherein the airstream with entrained ballast rock and debris is transported to the chamber whereafter the ballast rock and debris of the airstream with entrained ballast rock and debris enters the chamber at the chamber inlet and the velocity of the airstream with entrained ballast rock and debris slows thereby allowing the ballast rock to fall under gravity to the chamber discharge outlet while the debris exits the chamber through the chamber exhaust outlet;

vacuuming ballast rock and debris into the intake at the head end of the intake;

transporting the ballast rock into the chamber by the airstream created by applying vacuum to the head end of the intake; and, slowing the velocity of the airstream with entrained ballast rock and debris in the chamber thereby allowing the ballast rock to fall under gravity to the chamber discharge outlet while the debris exits the chamber through the chamber exhaust outlet.

2. A method for separating a mixed granular material into two segregated populations of granules, the two segregated populations of granules each characterized by a dissimilar range of specific gravity and defining a high specific gravity range granular material and a low specific gravity range granular material, the method for separating comprising the steps of:

providing an initial airstream, the initial airstream having a first velocity capable of suspending the mixed granular material;

incorporating the mixed granular material into the initial airstream to suspend and transport the mixed granular material;

slowing the initial airstream bearing the suspended mixed granular materials to a second velocity, slower than the first velocity, such that the high specific gravity range granular material falls from the slowed, initial airstream and the low specific gravity range granular material remains suspended in the slowed, initial airstream;

providing a second airstream, the second airstream upwardly directed and arranged to have a counter-current relationship to the falling high specific gravity range granular material, the second airstream having a velocity insufficient to entrain the falling high specific gravity range granular material but sufficient to entrain any low specific gravity range granular material;

subjecting the falling high specific gravity range granular material to the second airstream, so as to air-wash the falling high specific gravity granular material and remove any low specific gravity range granular material accompanying the falling high specific gravity range granular material; and, collecting the air-washed high specific gravity range granular material falling from the second airstream.

3. The method of claim 2, wherein the step of incorporating the mixed granular material into the initial airstream, includes one of the following steps:

vacuuming up the mixed granular material into the initial airstream; and, mechanically dispensing mixed granular material into the initial airstream.

4. The method of claim 2, wherein the step of slowing the initial airstream bearing the suspended mixed granular materials to a second velocity, slower than the first velocity, includes a step of providing a pre-exhaust:

wherein the provided pre-exhaust abruptly removes a portion of the initial airstream prior to a directional change of the airstream to approximately vertical;

further wherein the slowed initial airstream turns approximately vertical; and, wherein momentum of the suspended mixed granular material along with the slowed initial airstream carries the mixed granular material forward as the slowed initial airstream turns approximately vertical.

5. The method of claim 4, wherein the percentage of air removed by the provided pre-exhaust from the initial airstream is about 35% to about 50% of the volume of the initial airstream.

6. The method of claim 2, wherein the initial airstream is confined within a first cross-sectional area and further wherein the step of slowing the initial airstream bearing the suspended mixed granular materials to a second velocity, slower than the first velocity, includes a step of expanding the confining cross-sectional area to a second cross-sectional area, greater than the first cross-sectional area.

7. The method of claim 2 and further comprising the step of:

combining the second airstream, including any removed low specific gravity range granular material air-washed from the falling high specific gravity range material with the slowed, initial airstream including the suspended low specific gravity range granular material.

8. The method of claim 2, wherein the high specific gravity range granular material originates in a firearm projectile and the low specific gravity range material originates in a firing range backstop material.

9. The method of claim 2, wherein the high specific gravity range granular material includes metallic lead and the low specific gravity range material originates in a firing range backstop material.

10. The method of claim 2, wherein the high specific gravity range granular material consists of various types of higher density components and the low specific gravity range granular material consists of various types of lower density components.

* * * * *